(12) United States Patent
Edsinger et al.

(10) Patent No.: US 10,330,182 B2
(45) Date of Patent: Jun. 25, 2019

(54) ROBOT ACTUATOR UTILIZING A DIFFERENTIAL PULLEY TRANSMISSION

(71) Applicant: X Development LLC, Mountain View, CA (US)

(72) Inventors: Aaron Edsinger, San Francisco, CA (US); Philip Mullins, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 437 days.

(21) Appl. No.: 15/341,475

(22) Filed: Nov. 2, 2016

(65) Prior Publication Data
US 2017/0067547 A1 Mar. 9, 2017

Related U.S. Application Data

(62) Division of application No. 14/191,819, filed on Feb. 27, 2014, now Pat. No. 9,512,912.
(Continued)

(51) Int. Cl.
| | |
|---|---|
| *G05G 11/00* | (2006.01) |
| *F16H 19/08* | (2006.01) |
| *F16H 48/12* | (2012.01) |
| *F16H 7/12* | (2006.01) |
| *B25J 9/10* | (2006.01) |
| *F16H 7/02* | (2006.01) |
| *F16H 19/00* | (2006.01) |

(52) U.S. Cl.
CPC ............. *F16H 19/08* (2013.01); *B25J 9/104* (2013.01); *B25J 9/1045* (2013.01); *F16H 7/02* (2013.01); *F16H 7/12* (2013.01); *F16H 19/005* (2013.01); *F16H 48/12* (2013.01); *F16H 2019/085* (2013.01)

(58) Field of Classification Search
CPC ............... F16H 19/005; F16H 19/0622; F16H 2019/0695; F16H 2019/0609; F16H 48/12; B25J 9/104
See application file for complete search history.

(56) References Cited

U.S. PATENT DOCUMENTS

| | | | |
|---|---|---|---|
| 4,903,536 A * | 2/1990 | Salisbury, Jr. ........... | B25J 9/046 414/7 |
| 5,046,375 A | 9/1991 | Salisbury, Jr. et al. | |

(Continued)

*Primary Examiner* — Jake Cook
(74) *Attorney, Agent, or Firm* — McDonnell Boehnen Hulbert & Berghoff LLP

(57) ABSTRACT

An example robot actuator utilizing a differential pulley transmission is provided. As an example, a differential pulley actuator includes input drive gears for coupling to a motor and timing pulleys coupled together through the input drive gears. Rotation of the input drive gears causes rotation of a first timing pulley in a first direction and rotation of a second timing pulley in a second direction opposite the first direction. The actuator also includes multiple idler pulleys suspended between the timing pulleys and the output pulley, and the multiple idler pulleys are held in tension between the timing pulleys via a first tension-bearing element and the output pulley via a second tension-bearing element. The first tension-bearing element loops around the timing pulleys and the multiple idler pulleys. The output pulley couple to a load, and is configured to apply motion of the multiple idler pulleys to the load.

20 Claims, 15 Drawing Sheets

Related U.S. Application Data

(60) Provisional application No. 61/838,735, filed on Jun. 24, 2013.

(56) References Cited

U.S. PATENT DOCUMENTS

| | | |
|---|---|---|
| 5,207,114 A | 5/1993 | Salisbury, Jr. et al. |
| 9,145,955 B2 | 9/2015 | Ferlay et al. |
| 2013/0090194 A1 | 4/2013 | Ferlay et al. |

* cited by examiner

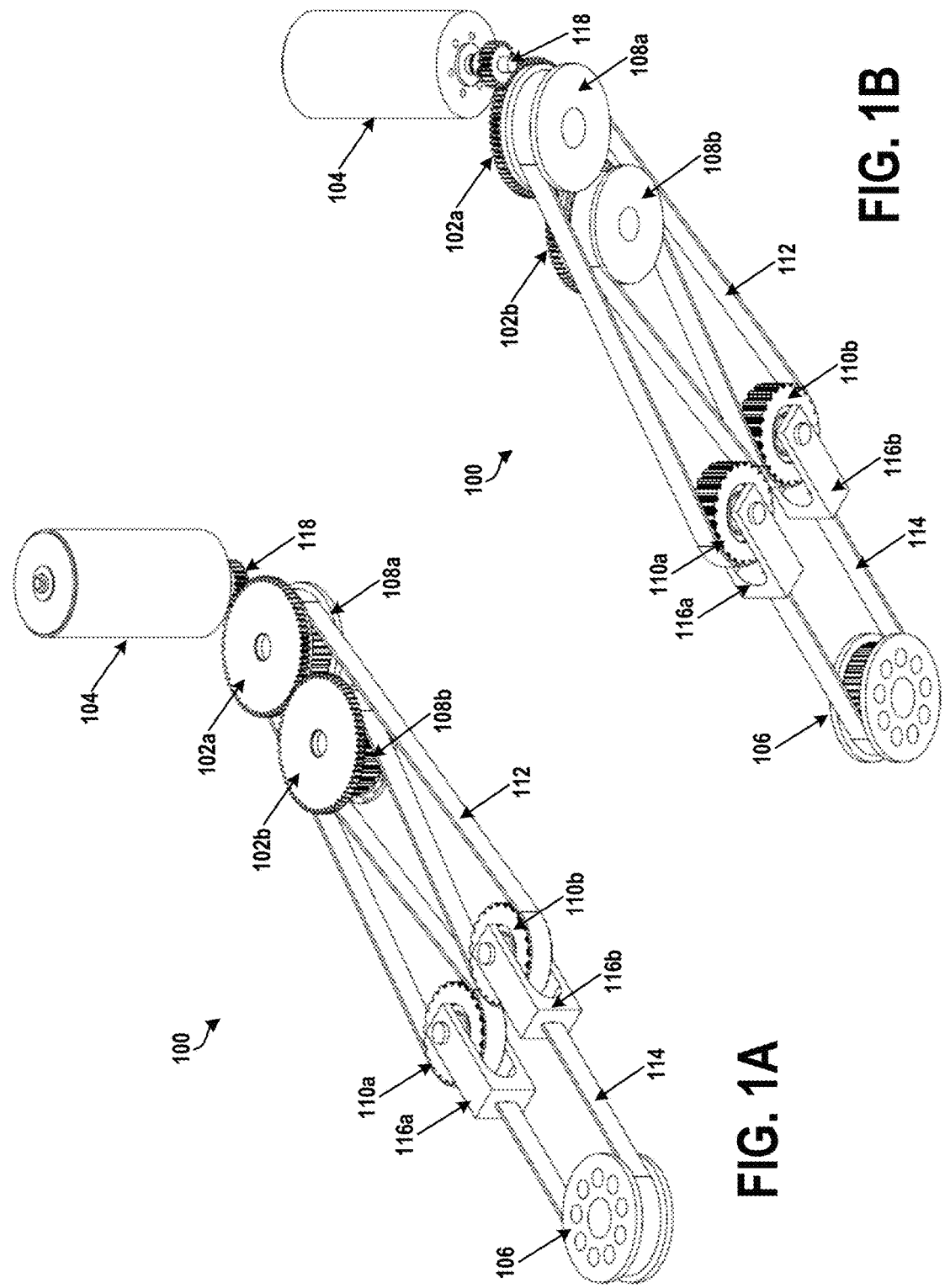

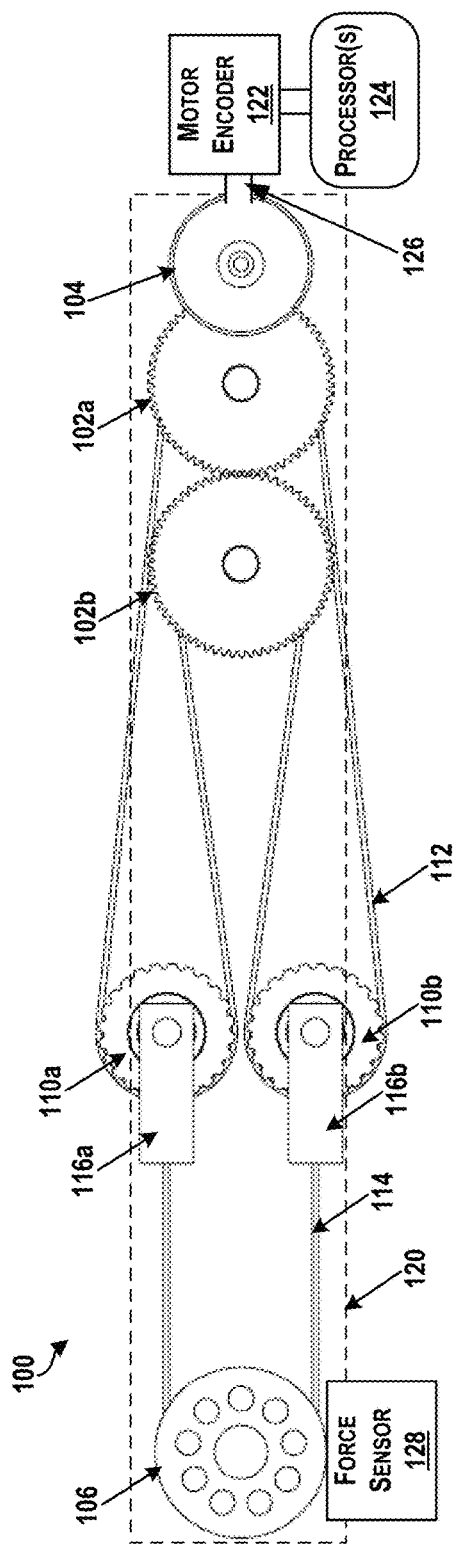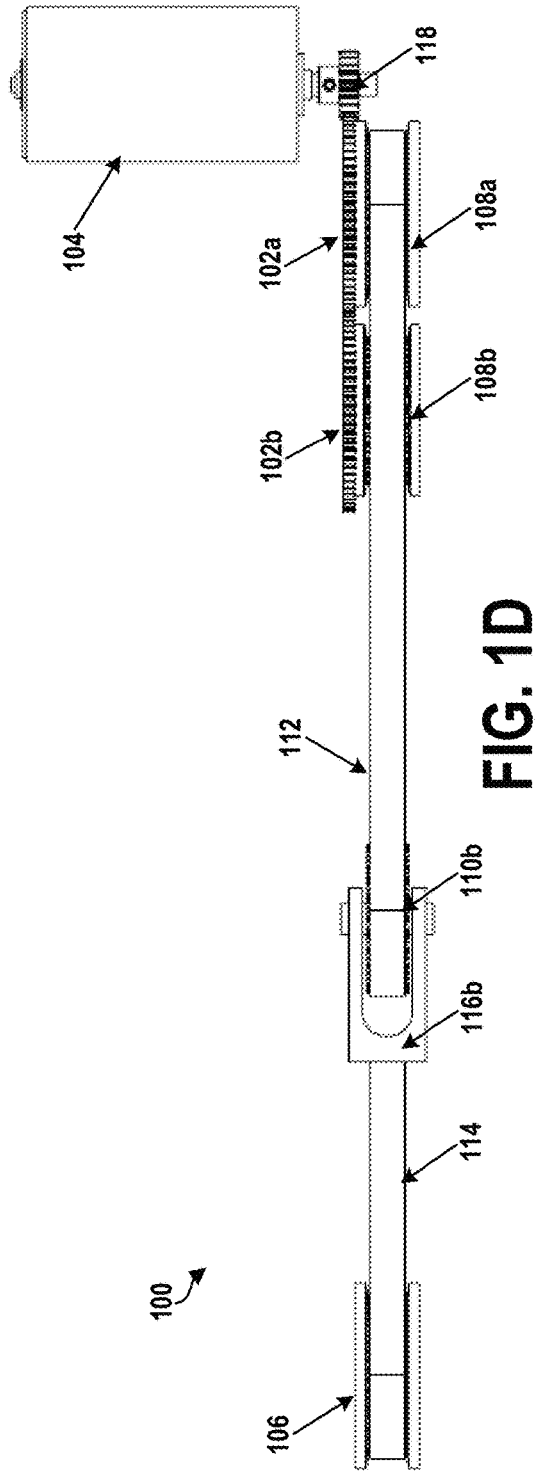

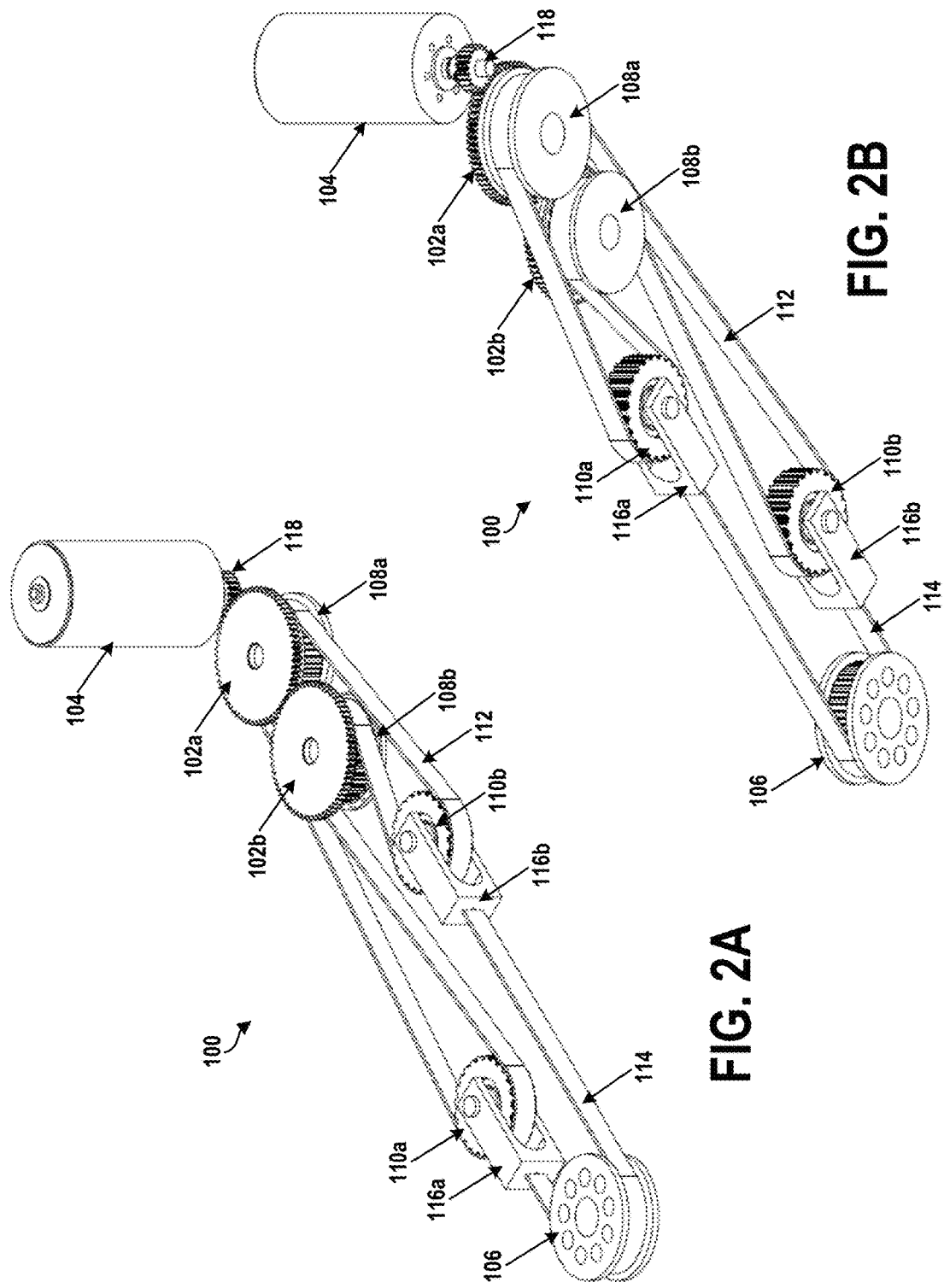

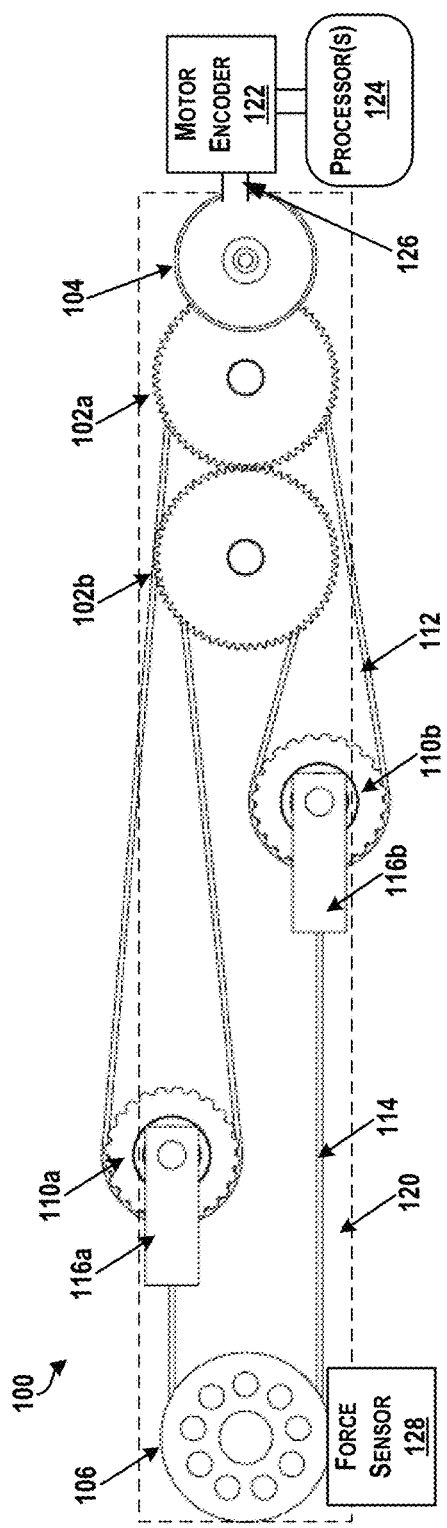
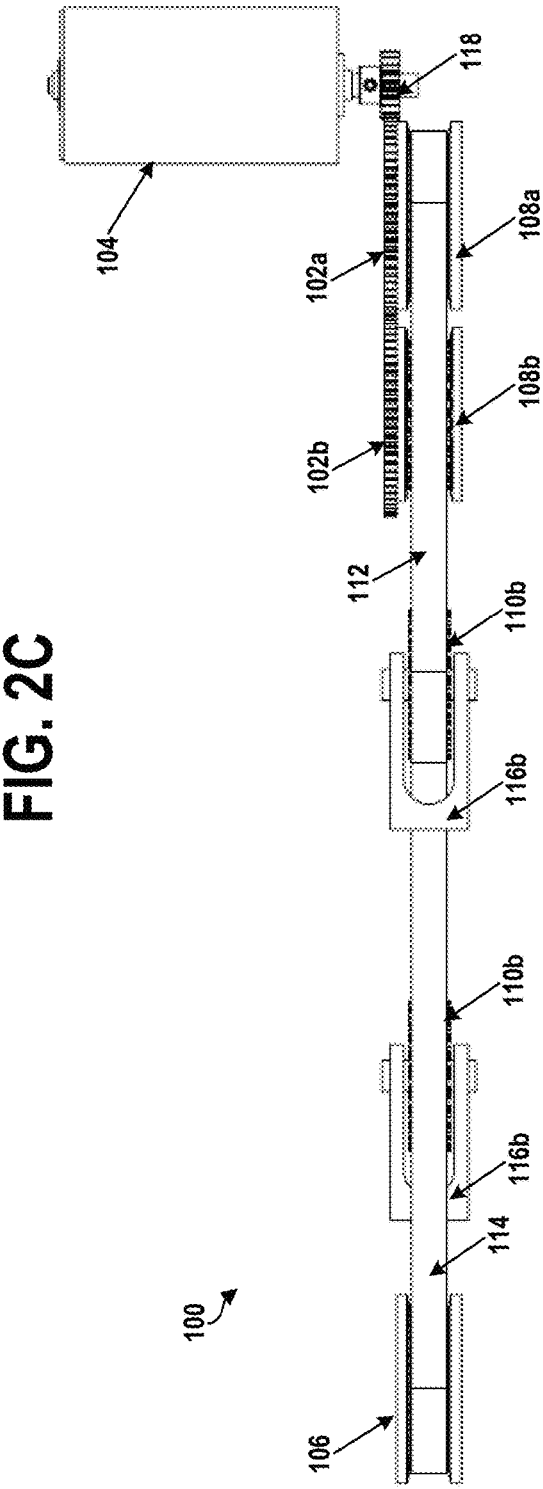
FIG. 2C
FIG. 2D

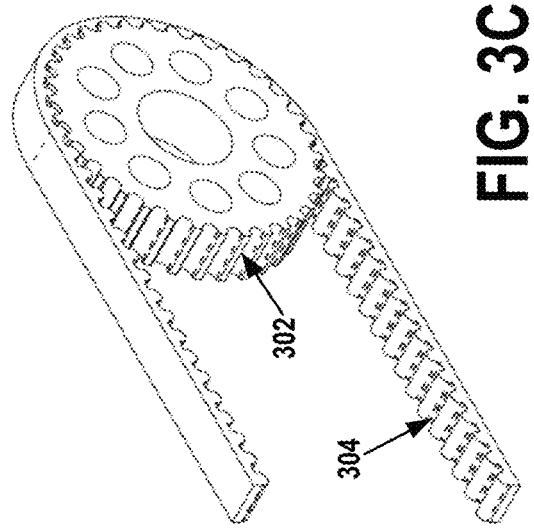
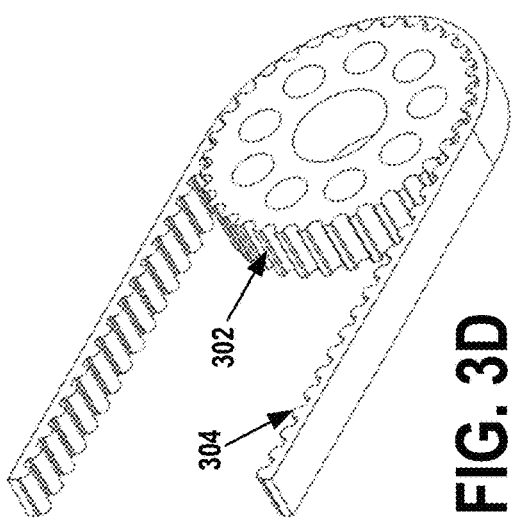
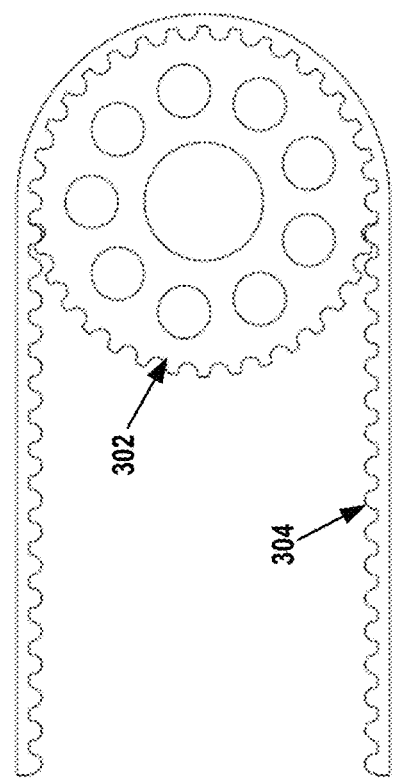
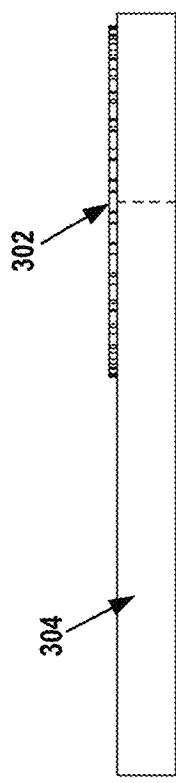

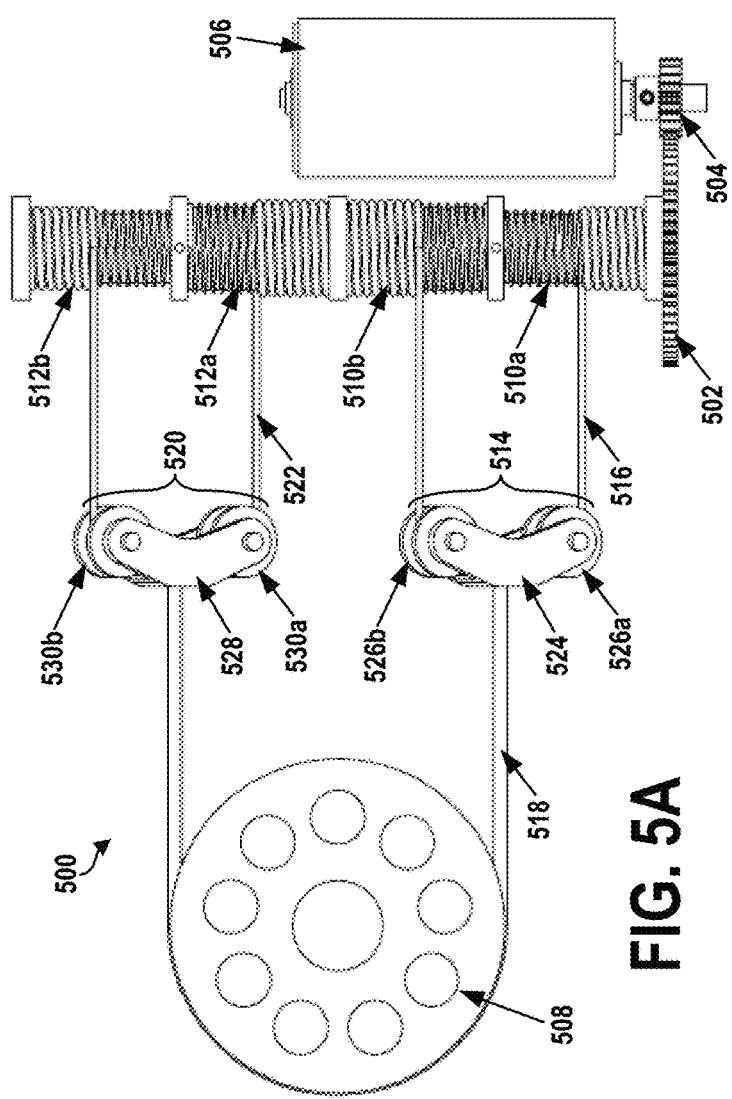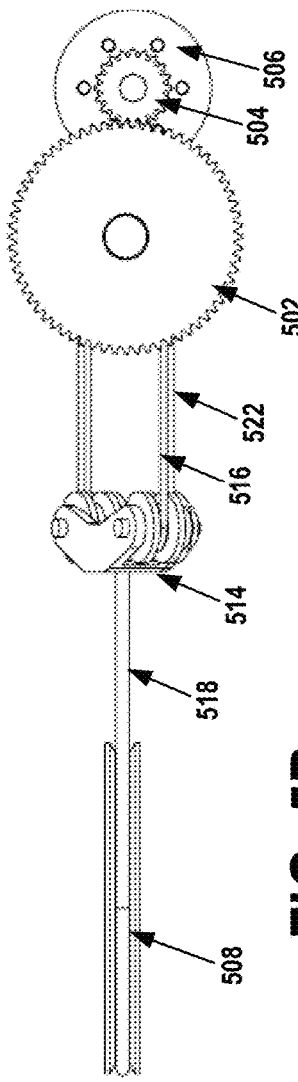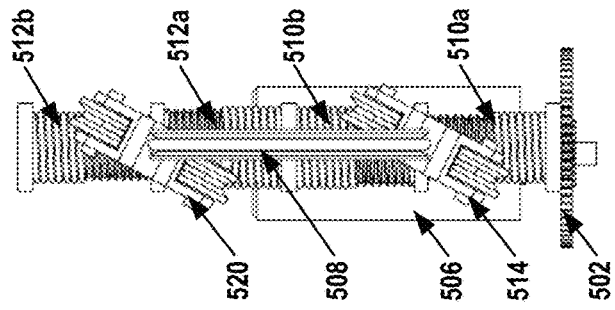

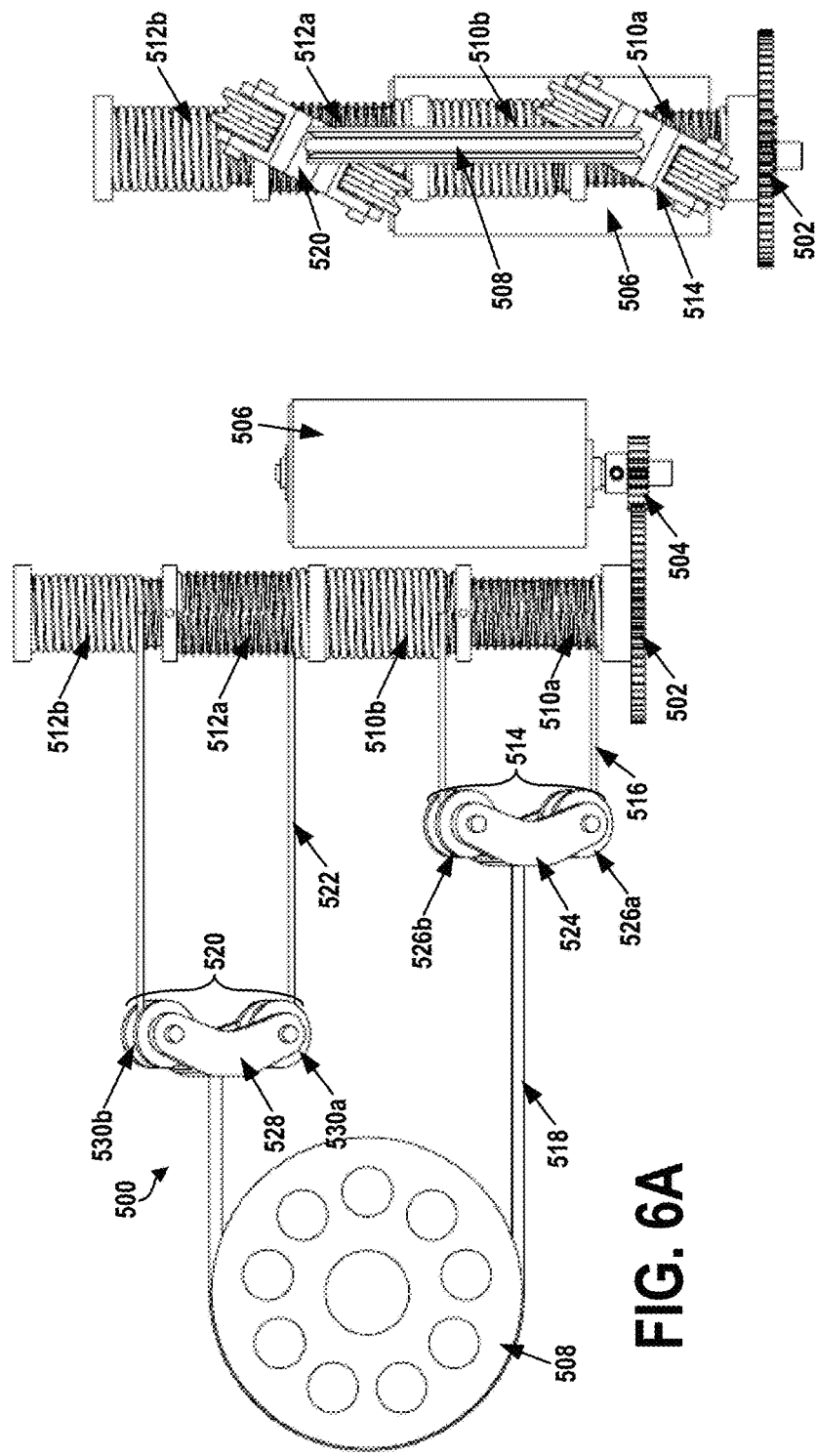

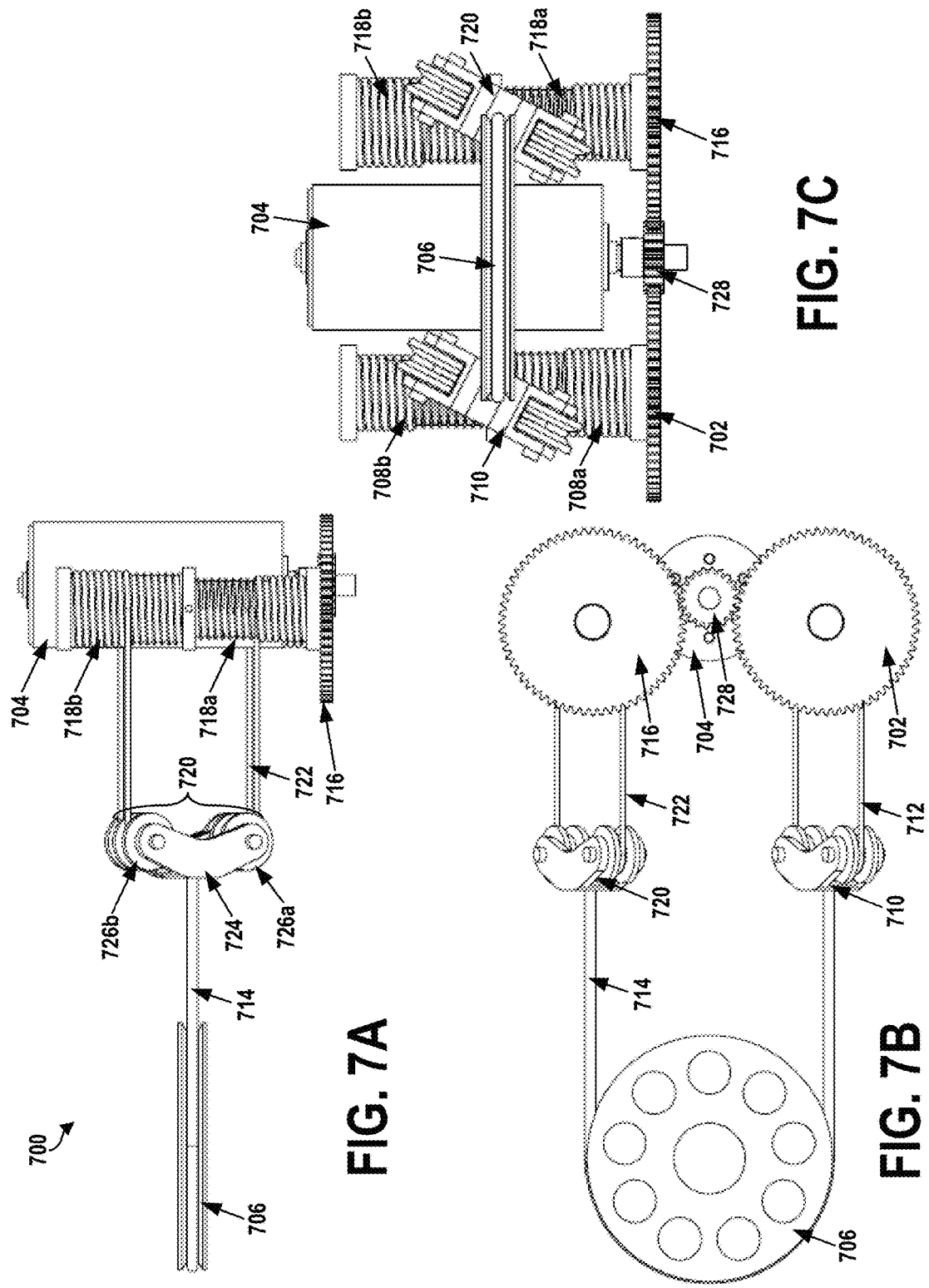

ROBOT ACTUATOR UTILIZING A DIFFERENTIAL PULLEY TRANSMISSION

CROSS-REFERENCE TO RELATED APPLICATION

The present application is a continuation of U.S. patent application Ser. No. 14/191,819, filed on Feb. 27, 2014, which claims priority to U.S. Patent Application Ser. No. 61/838,735, filed on Jun. 24, 2013, the entire contents of each of which are herein incorporated by reference.

BACKGROUND

Unless otherwise indicated herein, the materials described in this section are not prior art to the claims in this application and are not admitted to be prior art by inclusion in this section.

Electric motor actuators for robotic and automation systems often require a transmission (speed reducer) in order to operate within the speed-torque requirements of a specific application and of the motor. Commonly used systems include multi-stage gearboxes, timing belts, cable drive, harmonic drives, and cycloid gearboxes. These systems are often too inefficient, susceptible to overload damage, heavy, and require expensive precision manufacturing. Such systems are also often too expensive for consumer products when high performance is required.

As an example, harmonic drive systems can be used in high performance applications where low backlash and gear-ratios greater than 50:1 are required. The harmonic drive is proprietary, heavy, inefficient, and expensive for consumer application. Other cable drive systems can be lightweight and efficient; however, non-trivial transmission ratios may lead to complex multi-stage designs that require high preload forces and challenging cable management. Often it is desired to integrate a torque sensor such as a strain gauge load cell into the transmission in order to achieve closed loop torque control. Practically, integration of this sensor can prove challenging as the sensor wires typically rotate with the transmission output, and therefore, require cable management.

SUMMARY

In one example, a differential pulley actuator is provided that comprises one or more input drive gears for coupling to a motor, and the one or more input drive gears couple rotation of the motor to rotation of an output pulley. The differential pulley actuator also includes one or more timing belt pulleys coupled together through the one or more input drive gears, and rotation of the one or more input drive gears causes rotation of a first timing belt pulley in a first direction and rotation of a second timing belt pulley in a second direction opposite the first direction. The differential pulley actuator also includes multiple idler pulleys suspended between the one or more timing belt pulleys and the output pulley, and the multiple idler pulleys are held in tension between the one or more timing belt pulleys via a first tension-bearing element and the output pulley via a second tension-bearing element. The first tension-bearing element loops around the one or more timing belt pulleys and the multiple idler pulleys. The differential pulley actuator also includes the output pulley for coupling to a load, and the output pulley couples to the multiple idler pulleys via the second tension-bearing element looping around the output pulley and is configured to apply motion of the multiple idler pulleys to the load.

In another example, a differential pulley actuator is provided that comprises an input drive gear for coupling to a motor, and the input drive gear couples rotation of the motor to rotation of an output pulley. The differential pulley actuator also includes a first timing belt pulley pair and a second timing belt pulley pair coupled to the input drive gear, and rotation of the input drive gear causes rotation of the first timing belt pulley pair and the second timing belt pulley pair. The differential pulley actuator also includes a first idler pulley element suspended between the first timing belt pulley pair and the output pulley and held in tension to the first timing belt pulley pair via a first tension-bearing element and to the output pulley via a second tension-bearing element. The differential pulley actuator also includes a second idler pulley element suspended between the second timing belt pulley pair and the output pulley and held in tension to the second timing belt pulley pair via a third tension-bearing element and to the output pulley via the second tension-bearing element. The differential pulley actuator further includes the output pulley for coupling to a load, and the output pulley couples to the first idler pulley element and the second idler pulley element via the second tension-bearing element looping around the output pulley and is configured to apply motion of the first idler pulley element and the second idler pulley element to the load.

In another example, a differential pulley actuator is provided that comprises a first input drive gear for coupling to a motor, and the first input drive gear couples rotation of the motor to rotation of an output pulley. The differential pulley actuator also include a first timing belt pulley pair coupled to the first input drive gear, and rotation of the first input drive gear causes rotation of the first timing belt pulley pair. The differential pulley actuator also includes a first idler pulley element suspended between the first timing belt pulley pair and the output pulley and held in tension to the first timing belt pulley pair via a first tension-bearing element and to the output pulley via a second tension-bearing element. The differential pulley actuator also includes a second input drive gear for coupling to the motor, and the second input drive gear couples rotation of the motor to rotation of the output pulley. The differential pulley actuator also includes a second timing belt pulley pair coupled to the second input drive gear, and rotation of the second input drive gear causes rotation of the second timing belt pulley pair. The differential pulley actuator also includes a second idler pulley element suspended between the second timing belt pulley pair and the output pulley and held in tension to the second timing belt pulley pair via a third tension-bearing element and to the output pulley via the second tension-bearing element. The differential pulley actuator also includes the output pulley for coupling to a load, and the output pulley couples to the first idler pulley element and the second idler pulley element via the second tension-bearing element looping around the output pulley and is configured to apply motion of the first idler pulley element and the second idler pulley element to the load.

In still other examples, methods and computer program products including instructions executable by a device or by one or more processors to perform functions of the methods are provided. The methods may be executable for operating a differential pulley actuator, for example.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIGS. 1A-1D illustrate an example differential pulley actuator. FIG. 1A illustrates a top perspective view of the example differential pulley actuator, FIG. 1B illustrates a bottom perspective view of the example differential pulley actuator, FIG. 1C illustrates a top view of the example differential pulley actuator, and FIG. 1D illustrates a side view of the example differential pulley actuator.

FIGS. 2A-2D illustrate the example differential pulley actuator of FIGS. 1A-1D in a staggered position. FIG. 2A illustrates a top perspective view of the example differential pulley actuator, FIG. 2B illustrates a bottom perspective view of the example differential pulley actuator, FIG. 2C illustrates a top view of the example differential pulley actuator, and FIG. 2D illustrates a side view of the example differential pulley actuator, each in a staggered position.

FIGS. 3A-3D illustrate an example timing pulley and timing belt. FIG. 3A illustrates a top view of the example timing pulley and timing belt, FIG. 3B illustrates a side view of the example timing pulley and timing belt, FIG. 3C illustrates a top perspective view of the example timing pulley and timing belt, and FIG. 3D illustrates a bottom perspective view of the example timing pulley and timing belt.

FIG. 4A illustrates a top perspective view of the example differential pulley actuator, and FIG. 4B illustrates a top view of the example differential pulley actuator.

FIGS. 5A-5E illustrate another example differential pulley actuator in a nominal position. FIG. 5A illustrates a side view of the example differential pulley actuator, FIG. 5B illustrates a bottom view of the example differential pulley actuator, FIG. 5C illustrates an end view of the example differential pulley actuator, FIG. 5D illustrates a side perspective view of the example differential pulley actuator, and FIG. 5E illustrates a bottom perspective view of the example differential pulley actuator.

FIGS. 6A-6E illustrate the differential pulley actuator of FIGS. 5A-5E in a staggered position. FIG. 6A illustrates a side view of the example differential pulley actuator, FIG. 6B illustrates a bottom view of the example differential pulley actuator, FIG. 6C illustrates an end view of the example differential pulley actuator, FIG. 6D illustrates a side perspective view of the example differential pulley actuator, and FIG. 6E illustrates a bottom perspective view of the example differential pulley actuator.

FIGS. 7A-7E illustrate another example differential pulley actuator in a nominal position. FIG. 7A illustrates a side view of the example differential pulley actuator, FIG. 7B illustrates a bottom view of the example differential pulley actuator, FIG. 7C illustrates an end view of the example differential pulley actuator, FIG. 7D illustrates a side perspective view of the example differential pulley actuator, and FIG. 7E illustrates a bottom perspective view of the example differential pulley actuator.

DETAILED DESCRIPTION

Figure 4A:
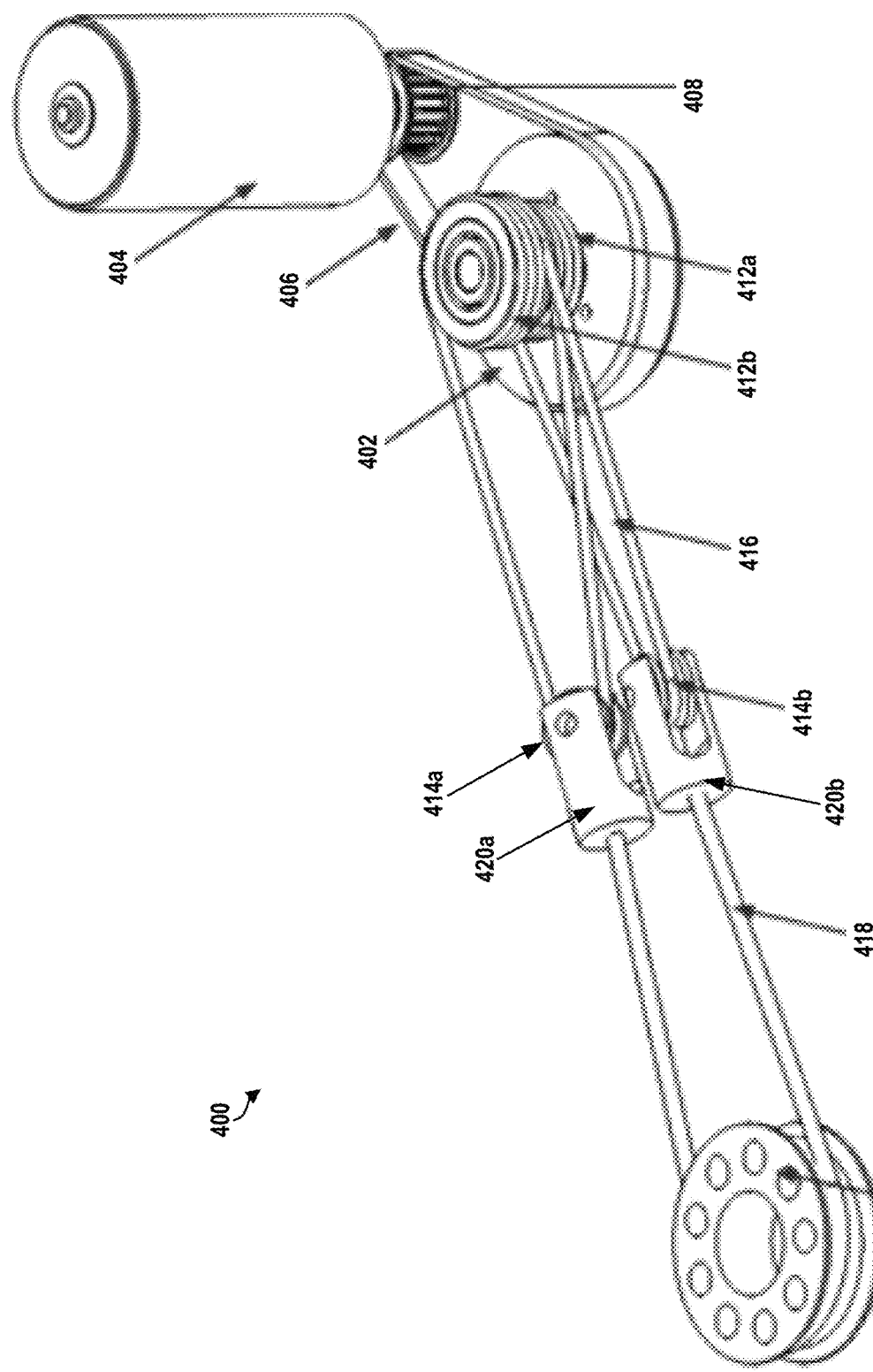
FIGS. 4A-4B illustrate another example differential pulley actuator.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

The differential pulley, also known as a windlass, may be configured to provide a mechanical advantage for lifting objects. A differential pulley includes a cable, rope, chain, belt, or other flexible tension-bearing device wrapped around two input drive pulleys of different radius (e.g., r1 and r2), and an output pulley, resting against a loop made in the flexible tension-bearing device, supports an output load. As the input drive pulleys are turned (e.g., at a rate w1), a tension-bearing device velocity entering and leaving the output pulley differs by a factor proportional to the difference in radius. This results in a translation of the output pulley and the load by $v=w1*(r2-r1)/2$. In this way, an example mechanical advantage can be chosen by selecting a difference in pulley radius.

Electric motors to rotate the drive pulleys may be efficient when operating at high speed and low torque. However, in a specific application of robotic actuators, typically high torques and low speeds are desired. Thus, electric motor robotic actuators may require a transmission with a non-trivial gear reduction to reduce a speed of the motor and increase a torque output. Such transmission technologies exist, including a spur gearbox, planetary gearbox, lead or ball screw, and Harmonic Drive gearheads. Such transmissions, however, may have low efficiency, high cost, high weight, backlash, low gear ratios, and/or low impact and load capacity. These example characteristics may make such transmissions undesired for robotic actuators that require high performance servo control in a lightweight, low-cost mechanism such as a robot manipulator.

Within examples, systems, devices, and differential pulley actuators are described for obtaining output motion of a joint (e.g., such as robot joint) given rotary input of a motor (e.g., electric motor) with a differential pulley employed between the input and output. In some examples, a continuous loop tension-bearing element (e.g., belt, chain, cable, etc.) is utilized in the differential pulley such that a pull-pull linear motion may be generated between two idler pulleys. This motion can then be applied to an output load in a rotary or linear motion.

Referring now to the figures, FIGS. 1A-1D illustrate an example differential pulley actuator 100. FIG. 1A illustrates a top perspective view of the example differential pulley actuator 100, FIG. 1B illustrates a bottom perspective view of the example differential pulley actuator 100, FIG. 1C illustrates a top view of the example differential pulley actuator 100, and FIG. 1D illustrates a side view of the example differential pulley actuator 100.

The differential pulley actuator 100 includes input drive gears 102a-b for coupling to a motor 104. The input drive gears 102a-b couple rotation of the motor 104 to rotation of an output pulley 106. The differential pulley actuator 100 also includes timing belt pulleys 108a-b, and the timing belt pulley 108a couples to the input drive gear 102a and the timing belt pulley 108b couples to the input drive gear 102b. Rotation of the input drive gears 102a-b causes rotation of one of the timing belt pulleys 108a-b in a direction and rotation of the other timing belt pulley in an opposite direction. The timing belt pulleys 108a-b may have different radiuses, which is required to create a gear reduction, for example. For example, the timing belt pulley 108b may have a smaller radius than the timing belt pulley 108a.

The differential pulley actuator 100 also includes idler pulleys 110a-b suspended between the timing belt pulleys 108a-b and the output pulley 106. The idler pulleys 110a-b are held in tension between the timing belt pulleys 108a-b via a tension-bearing element 112 and the output pulley 106 via another tension-bearing element 114. The tension-bearing element 112 may be an endless timing belt that loops around the timing belt pulleys 108a-b and the idler pulleys 110a-b. The other tension-bearing element 114 may be a timing belt enabling the output pulley 106 to couple to the idler pulleys 110a-b by looping around the output pulley 106. The output pulley 106 couples to a load (not shown) and is configured to apply motion of the idler pulleys 110a-b to the load. A differential or other mechanism may be attached to the output pulley 106 to provide a multiple degree of freedom (DOF) joint.

The tension-bearing elements 112 and 114 may be any of a belt, a toothed belt, a chain, a cable, a string or other material as needed for an application of the differential pulley actuator 100. For example, a load capacity of the differential pulley actuator 100 may be limited only to the strength of the tension-bearing elements 112 and 114, and thus, a material for the tension-bearing elements 112 and 114 can be selected appropriately.

The idler pulleys 110a-b are mounted within holders 116a-b, and the tension-bearing element 114 couples to the holders 116a-b using screws or other attachment mechanisms. The holders 116a-b allow the idler pulleys 110a-b to rotate on freely.

The differential pulley actuator 100 may also including a motor pinion gear 118 coupled to the motor 104 and the drive gear 102a for causing rotation of the drive gear 102a.

In an example operation, the drive gears 102a-b are driven by the motor 104 using the motor pinion gear 118. The drive gears 102a-b may have the same radius, but each timing belt pulley 108a-b may have a different radius (e.g., timing belt pulley 108a may have a larger radius than timing belt pulley 108b) so that driving both timing belt pulleys 108a-b at a same rate creates a difference in speed between the timing belt pulleys 108a-b creating a pull in one direction on the idler pulleys 110a-b to drive the output pulley 106. Thus, rotation of the motor 104 (e.g., rate Wm) causes rotation of the timing belt pulley 108a (e.g., at rate Wa, radius Ra) and rotation of the timing belt pulley 108b in an opposite direction (e.g., at rate Wb, radius Rb). The tension-bearing element 112 is looped around the timing belt pulleys 108a-b and the idler pulleys 110a-b. The idler pulleys 110a-b are free to move and are held in tension using the tension-bearing elements 112 and 114. Each idler pulley 110a-b then translates at a rate in equal and opposite directions of the following:

$$V = \pm \frac{(Wa \times Ra - Wb \times Rb)}{2}$$

A difference in rotation speed between the timing belt pulleys 108a-b creates a pull in a direction on one of the idler pulleys 110a-b to pull the tension-bearing element 114 and drive the output pulley 106.

Within examples, a pull-pull type linear motion is created by the idler pulleys 110a-b and can be used in rotary joints and linear actuators. For instance, the tension-bearing element 114 (e.g., drive-belt) attaches to the output pulley 106 that is driven at a rate Wd and has radius Rd, to which an actuator load may be attached. A gear-ratio of the differential pulley actuator 100 is a ratio $$N = \frac{Wm}{Wd} = Wm \times \frac{Rd}{V}$$

The timing belt pulleys 108a-b provide a differential gear-ratio between the motor 104 and the timing belt pulleys 108a-b. Thus, a mechanical advantage N can be designed from 1:1 to nearly infinite:1, in some examples. In example uses, a rotary robot transmission may utilize a range of about N=30:1 to 1000:1. The differential pulley actuator 100 can thus achieve a wide range of gear-ratios, and has a load capacity limited only to the belt strength. The differential pulley actuator 100 also has low backlash, which may only be present in a single gear stage. The tension-bearing elements 112 and 114 have zero backlash.

FIG. 1C illustrates a top view of the differential pulley actuator 100, and illustrates that the motor 104, the input drive gears 102a-b (and the timing belt pulleys 108a-b) may be held fixed in space mounted to frame 120. The output pulley 106 may also be mounted to the frame 120 as well. The frame 120 may be any type of housing and may be configured as an endoskeleton structure in which the differential pulley actuator 100 is mounted on an exterior of the frame 120, or as an exoskeleton in which the differential pulley actuator 100 is mounted within a clamshell type structure.

In FIG. 1C, the differential pulley actuator 100 is also shown to include a motor encoder 122 coupled to the motor 104 to determine a position of the motor 122 and enable a control loop to control position of the output pulley 106. The motor encoder 122 may couple to a processor 124 through a communication bus 126. The processor 124 may receive outputs of the motor encoder 122 to determine a position of the motor 122 and control a position of the output pulley 106 by controlling an input current to the motor 104, for example.

In FIG. 1C, the differential pulley actuator 100 is also shown to include a force sensor 128 coupled to the output pulley 106. In other examples, tensile force sensors could be placed between the holder 116a and the tension-bearing element 114 and between the holder 116b and the tension-bearing element 114 to measure a tension of the tension-bearing element 114. The processor 124 may receive outputs of the force sensor 128 (e.g., which may be a capacitive sensor, a tension sensor, etc.) to control an input to the motor 104 based a force or tension in the tension-bearing element 120, for example.

FIGS. 2A-2D illustrate the example differential pulley actuator 100 in a staggered position. FIG. 2A illustrates a top perspective view of the example differential pulley actuator 100, FIG. 2B illustrates a bottom perspective view of the example differential pulley actuator 100, FIG. 2C illustrates a top view of the example differential pulley actuator 100, and FIG. 2D illustrates a side view of the example differential pulley actuator 100, each in a staggered position.

As shown in FIGS. 2A-2D, the tension-bearing element 112 creates a pull-pull linear motion between the idler pulleys 110a-b based on rotation of the motor 104. For example, the tension-bearing element 112 causes movement of the idler pulleys 110a-b due to rotation of the timing belt pulleys 108a-b, and the movement of the idler pulleys 110a-b causes rotation of the output pulley 106 through pulling of the tension-bearing element 114 by the idler pulleys 110*a-b*. As shown in FIGS. 2A-2D, the movement of the idler pulleys 110*a-b* includes the idler pulley 110*a* moving toward the output pulley 106 and the idler pulley 110*b* moving away from the output pulley 106. Such movement causes the tension-bearing element 114 to rotate the output pulley 106.

The idler pulleys 110*a-b* are held in tension and floating in space. In some examples, the idler pulleys 110*a-b* could be guided to move in a particular direction, for instance by a linear guide. Thus, in operation, the differential pulley actuator 100 may be designed to provide sufficient space between the idler pulleys 110*a-b* so that during movement, the idler pulleys 110*a-b* do not contact each other. A design can be used to provide sufficient range of motion to drive the transmission. For a larger range of motion, more space may be needed. In addition, a majority of the weight of the differential pulley actuator 100 is at one end of the actuator including the motor 104 and input drive gears 102*a-b*. In an example use, for a robot arm (e.g., bicep), weight may be configured as at a shoulder positioned, and an output at an elbow position, and thus, the differential pulley actuator 100 may provide an advantageous configuration to position the majority of the weight at one end.

FIGS. 3A-3D illustrate an example timing pulley 302 and timing belt 304. FIG. 3A illustrates a top view of the example pulley 302 and belt 304, FIG. 3B illustrates a side view of the example pulley 302 and belt 304, FIG. 3C illustrates a top perspective view of the example pulley 302 and belt 304, and FIG. 3D illustrates a bottom perspective view of the example pulley 302 and belt 304.

In FIGS. 3A-3D the pulley 302 includes teeth, and the belt 304 is a toothed belt that interlocks to the teeth of the pulley 302. The pulley 304 may be any of the pulleys in FIGS. 1A-1D and FIGS. 2A-2D, and the belt 304 may be either or both of the tension-bearing elements 112 and 114, for example.

The belt 304 has a specific tooth profile and enables accurate positioning on the pulley 302 along with an ability to efficiently transfer high loads, for example. For example, the tooth profile of the belt 304 matches the tooth profile of the pulley 302 to match together for zero backlash.

Figure 4B:
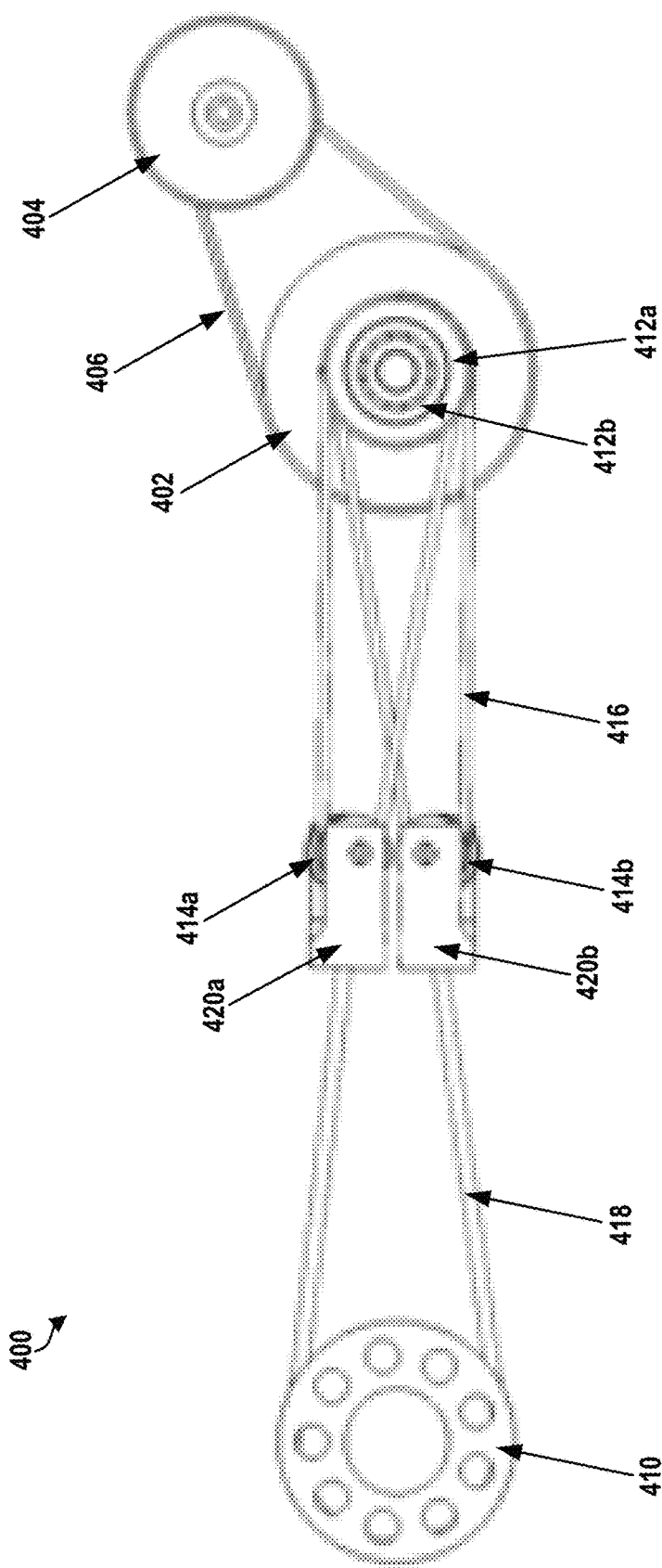

FIGS. 4A-4B illustrate another example differential pulley actuator 400. FIG. 4A illustrates a top perspective view of the example differential pulley actuator 400, and FIG. 4B illustrates a top view of the example differential pulley actuator 400.

The differential pulley actuator 400 includes a motor pulley 402 for coupling to a motor 404 through a timing belt 406. The timing belt 406 wraps around the motor pulley 402 and a motor gear 408. The motor pulley 402 couples rotation of the motor 404 to rotation of an output pulley 410. The differential pulley actuator 400 also includes drive pulleys 412*a-b*, and the drive pulleys 412*a-b* couple to the motor pulley 402. Rotation of the motor pulley 402 causes rotation of the drive pulleys 412*a-b*. The drive pulleys 412*a-b* may have different radiuses. For example, the drive pulley 412*a* may have a smaller radius than the drive pulley 412*b*.

The differential pulley actuator 400 also includes idler pulleys 414*a-b* suspended between the drive pulleys 412*a-b* and the output pulley 410. The idler pulleys 414*a-b* are held in tension between the drive pulleys 412*a-b* via a tension-bearing element 416 and the output pulley 410 via another tension-bearing element 418. The tension-bearing element 416 may be an endless string that loops around the drive pulleys 412*a-b* and the idler pulleys 414*a-b*. The other tension-bearing element 418 may be a drive string enabling the output pulley 410 to couple to the idler pulleys 414*a-b* by looping around the output pulley 410. The output pulley 410 couples to a load (not shown) and is configured to apply motion of the idler pulleys 414*a-b* to the load. A differential or other mechanism may be attached to the output pulley 410 to provide a multiple degree of freedom (DOF) joint.

The idler pulleys 414*a-b* are mounted within holders 420*a-b*, and the tension-bearing element 418 couples to the holders 420*a-b* using screws or other attachment mechanisms. The holders 420*a-b* allow the idler pulleys 414*a-b* to rotate on pins.

The tension-bearing elements 416 and 418 may be a string, wire, cable, or other material as needed for an application of the differential pulley actuator 400. The tension-bearing element 416 may be an endless loop cable manufactured from a low-stretch high strength material, such as Vectran or steel. The drive pulleys 412*a-b* may be attached into a single unit because the tension-bearing elements 416 and 418 can bend out of a rotation plane and pass past each-other. This enables a more compact, zero-backlash design.

The drive pulleys 412*a-b* may be threaded or include grooves, and the tension-bearing element 416 may be a cable that wraps around the drive pulleys 412*a-b* into threads to cause rotation of the output pulley 410 in a first direction and unwraps from the drive pulleys 412*a-b* to cause rotation of the output pulley 410 in a second direction. Thus, the drive pulleys 412*a-b* wrap up to drive in one direction (e.g., wrapping around a few times), and wraps down or oppositely to drive in the other direction.

The idler pulleys 414*a-b* are floating in space and held by tension between the drive pulleys 412*a-b* and the output pulley 410. Thus, in operation, as the idler pulleys 414*a-b* move back and forth, the idler pulleys 414*a-b* change angles, possibly vibrate, and may contact each other. A layout of the idler pulleys 414*a-b* should be provided to enable enough space to operate freely. A diameter of the output pulley 410 may be increased to provide more space. An amount of space needed may depend on a size of a load to drive, for example.

Similarly to the differential pulley actuator 100 in FIGS. 1A-1D and FIGS. 2A-2D, the differential pulley actuator 400 in FIGS. 4A-4B may also include a servo control loop added to the motor 404 to control an output position based on a motor position, a force sensor attached to a transmission output and a force control loop closed between the motor 404 and the load and transmission elasticity can be modeled and used to estimate a load position or load force, and the cable may be replaced with a toothed belt, a chain, a steel band, or other flexible member.

Figure 5D:
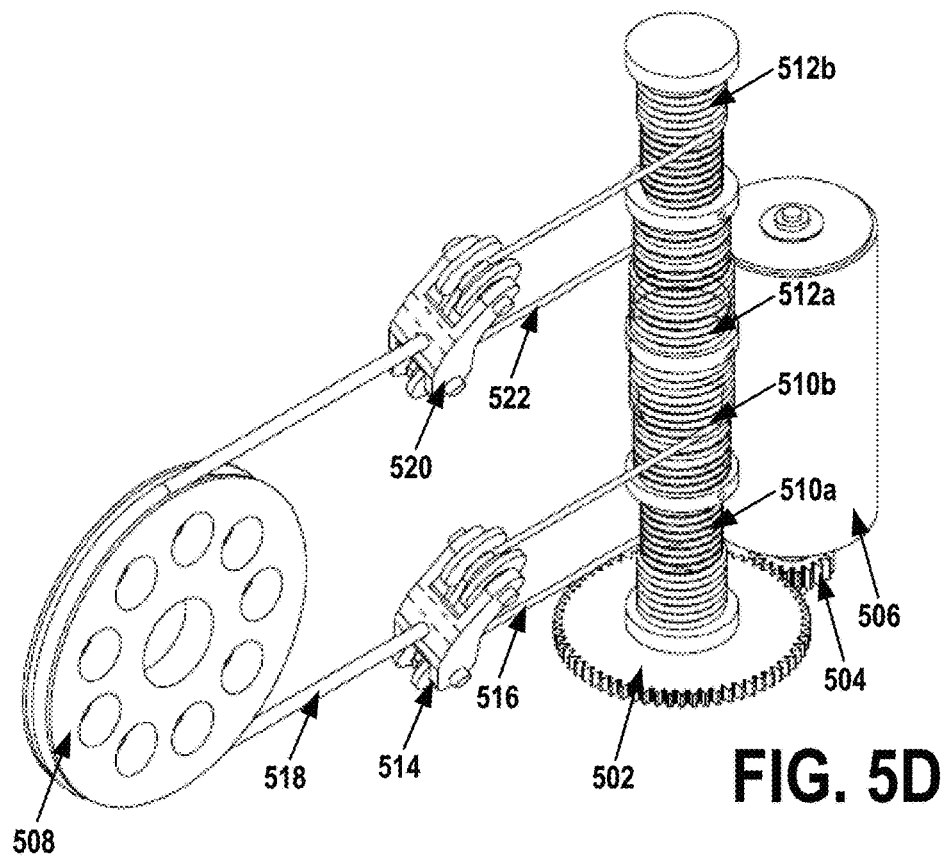
Figure 5E:
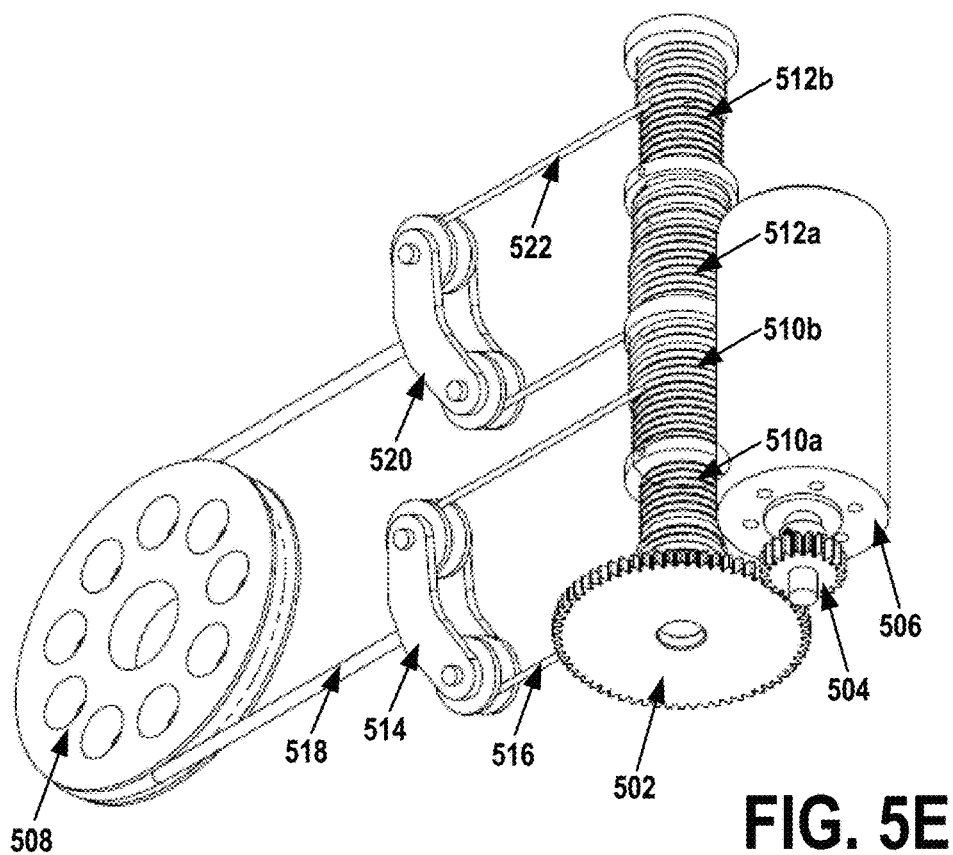

FIGS. 5A-5E illustrate another example differential pulley actuator 500. FIG. 5A illustrates a side view of the example differential pulley actuator 500, FIG. 5B illustrates a bottom view of the example differential pulley actuator 500, FIG. 5C illustrates an end view of the example differential pulley actuator 500, FIG. 5D illustrates a side perspective view of the example differential pulley actuator 500, and FIG. 5E illustrates a bottom perspective view of the example differential pulley actuator 500. FIGS. 5A-5E illustrate the differential pulley actuator 500 in a nominal position.

The differential pulley actuator 500 includes an input drive gear 502 for coupling to a gear 504 of a motor 506. The input drive gear 502 couples rotation of the motor 506 to rotation of an output pulley 508. The differential pulley actuator 500 also includes a first timing belt pulley pair 510*a-b* and a second timing belt pulley pair 512*a-b* coupled to the input drive gear 502. Rotation of the input drive gear 502 causes rotation of the first timing belt pulley pair 510a-b and the second timing belt pulley pair 512a-b. The differential pulley actuator 500 also includes a first idler pulley element 514 suspended between the first timing belt pulley pair 510a-b and the output pulley 508 and held in tension to the first timing belt pulley pair 510a-b via a tension-bearing element 516 and to the output pulley 508 via a tension-bearing element 518. The differential pulley actuator 500 also includes a second idler pulley element 520 suspended between the second timing belt pulley pair 512a-b and the output pulley 508 and held in tension to the second timing belt pulley pair 512a-b via a tension-bearing element 522 and to the output pulley 508 via the tension-bearing element 518.

The output pulley 508 couples to a load (not shown). The tension-bearing element 518 loops around the output pulley 508, and the output pulley 508 is configured to apply motion of the first idler pulley element 514 and the second idler pulley element 520 to the load. A differential or other mechanism may be attached to the output pulley 508 to provide a multiple degree of freedom (DOF) joint.

The first idler pulley element 514 includes a frame 524 that couples to the tension-bearing element 518, and multiple pulleys 526a-b couple to the frame 524. The tension-bearing element 516 loops around the multiple pulleys 526a-b. Similarly, the second idler pulley element 520 includes a frame 528 that couples to the tension-bearing element 518, and multiple pulleys 530a-b couple to the frame 528. The tension-bearing element 522 loops around the multiple pulleys 530a-b.

Within examples, the differential pulley actuator 500 includes the first timing belt pulley pair 510a-b coupled to the input drive gear 502, and the second timing belt pulley pair 512a-b couples to the first timing belt pulley pair 510a-b such that the first timing belt pulley pair 510a-b and the second timing belt pulley pair 512a-b are coupled in serial in a stacked configuration. In addition, the configuration of the differential pulley actuator 500 is such that input drive gear 502 and the output pulley 508 each rotate about respective axes that are perpendicular to each other.

Figure 6D:
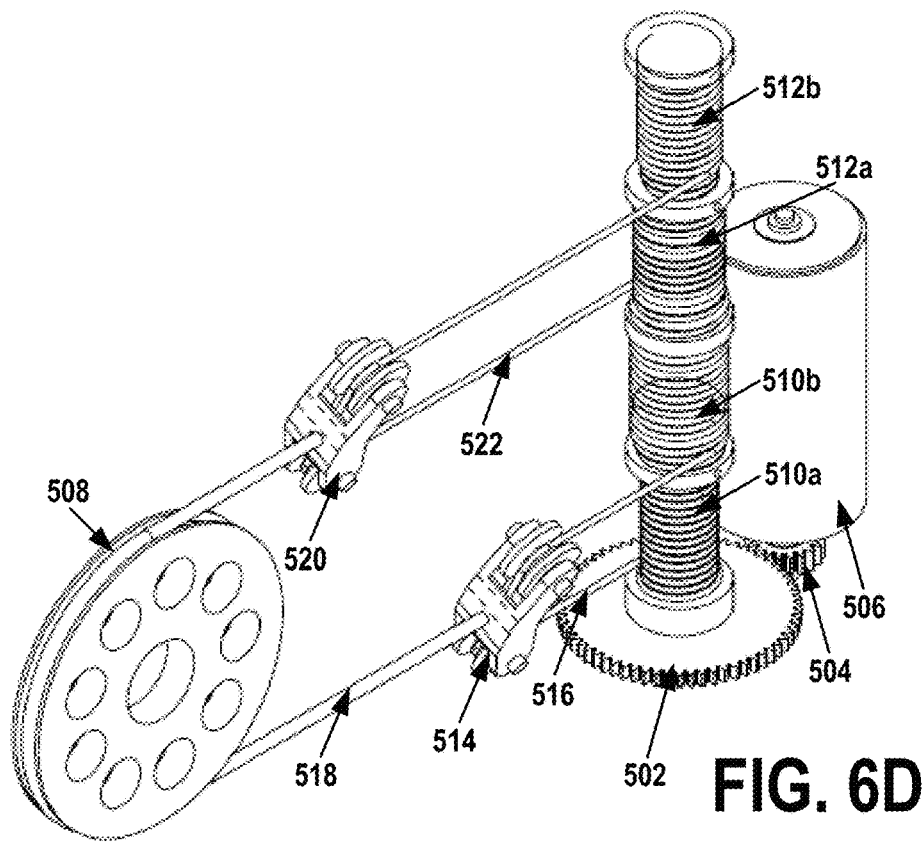
Figure 6E:
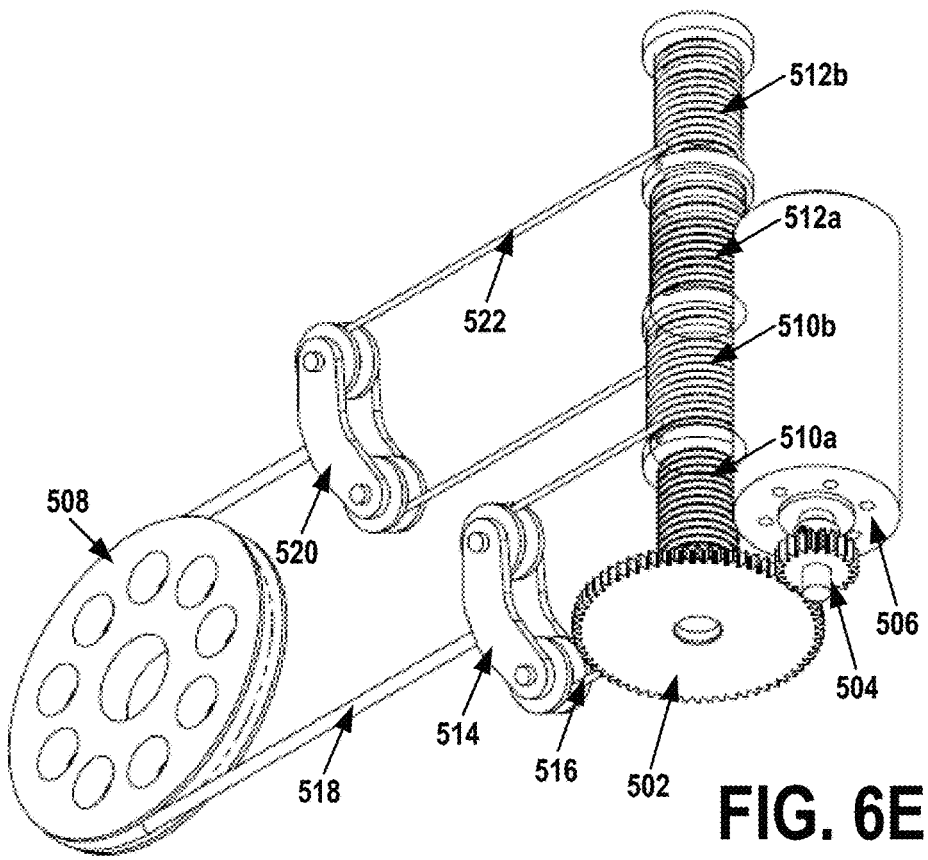

FIGS. 6A-6E illustrate the differential pulley actuator 500 in a staggered position. FIG. 6A illustrates a side view of the example differential pulley actuator 500, FIG. 6B illustrates a bottom view of the example differential pulley actuator 500, FIG. 6C illustrates an end view of the example differential pulley actuator 500, FIG. 6D illustrates a side perspective view of the example differential pulley actuator 500, and FIG. 6E illustrates a bottom perspective view of the example differential pulley actuator 500.

Within examples, in operation of the differential pulley actuator 500, rotation of the first timing belt pulley pair 510a-b in one direction causes the tension-bearing element 516 to wind onto a first pulley 510b of the first timing belt pulley pair 510a-b and unwind from a second pulley 510a of the first timing belt pulley pair 510a-b. Similarly, rotation of the second timing belt pulley pair 5112a-b causes the tension-bearing element 522 to wind onto a first pulley 512b of the second timing belt pulley pair 512a-b and unwind from a second pulley 512a of the second timing belt pulley pair 512a-b. Rotation of the first timing belt pulley pair 510a-b and the second timing belt pulley pair 512a-b causes movement of the first idler pulley element 514 and the second idler pulley element 520 toward and away from the output pulley 508 resulting in the tension-bearing element 518 being pulled to rotate the output pulley 508.

The examples shown in FIGS. 6A-6E illustrate the first idler pulley element 514 moving away from the output pulley 508 and the second idler pulley element 520 moving toward the output pulley 508 resulting in the first idler pulley element 514 and the second idler pulley element 520 being in a staggered position.

The differential pulley actuator 500 includes a dual design with the first timing belt pulley pair 510a-b and the second timing belt pulley pairs 512a-b. Rotation causes winding up on one pulley of each pair and winding down on the other pulley of each pair. The two separate idler assemblies (the first idler pulley element 514 and the second idler pulley element 520) are driven back and forth. There is a single rotating assembly (e.g., input drive gear 502) as opposed to two, which requires fewer bearings and may be simpler to manufacture.

Figure 7D:
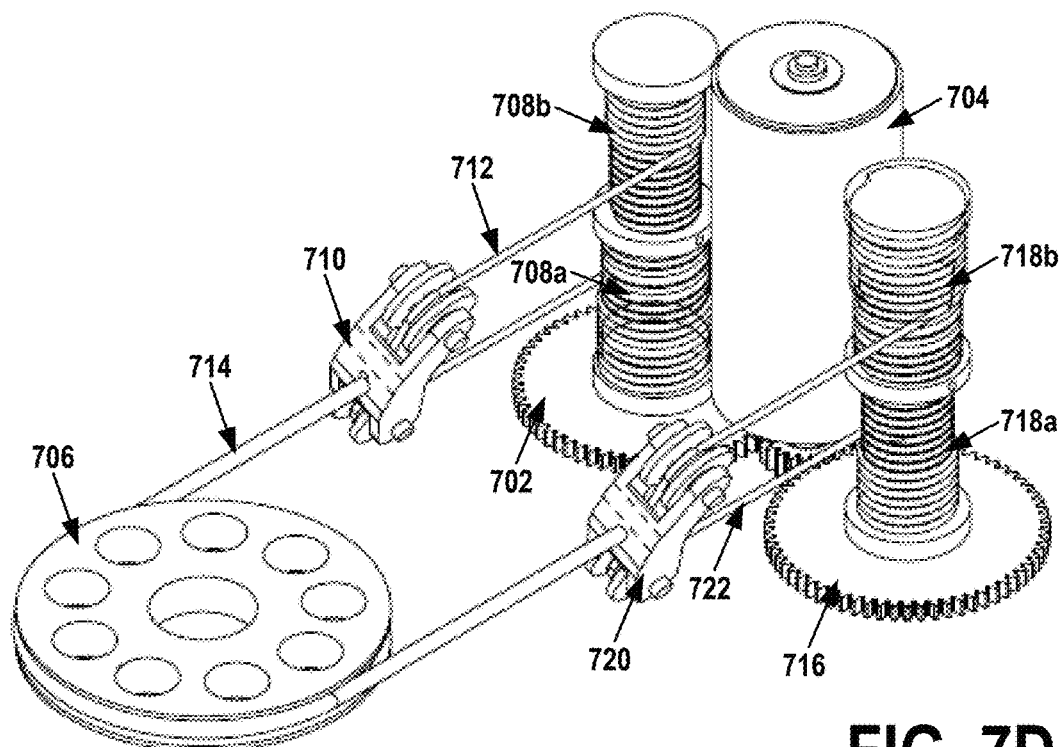
Figure 7E:
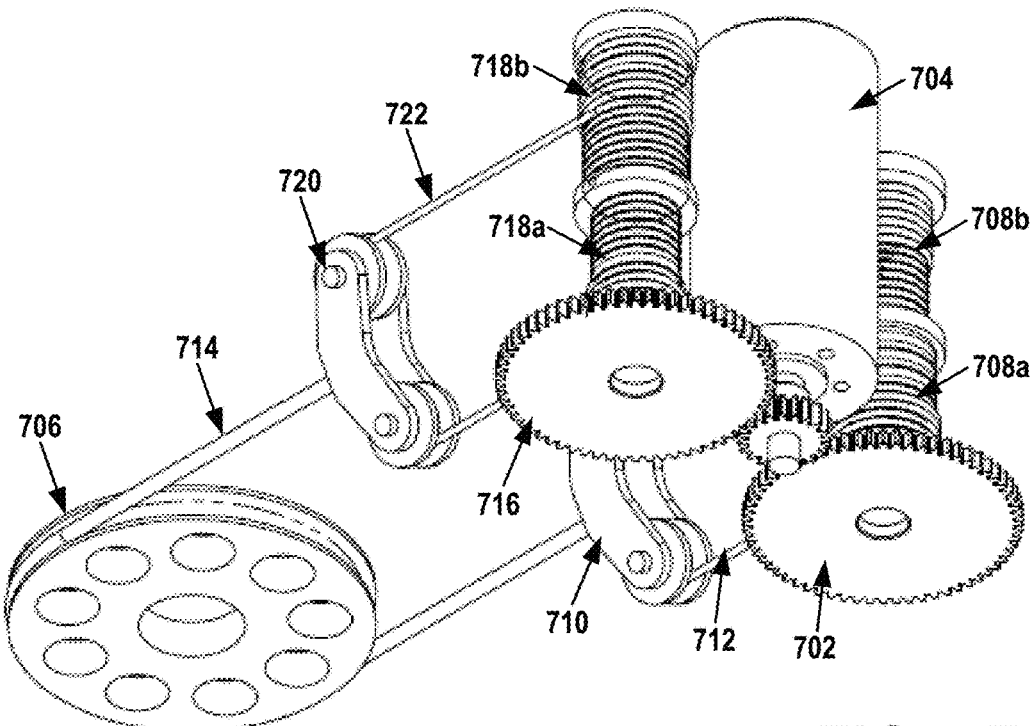

FIGS. 7A-7E illustrate another example differential pulley actuator 700 in a nominal position. FIG. 7A illustrates a side view of the example differential pulley actuator 700, FIG. 7B illustrates a bottom view of the example differential pulley actuator 700, FIG. 7C illustrates an end view of the example differential pulley actuator 700, FIG. 7D illustrates a side perspective view of the example differential pulley actuator 700, and FIG. 7E illustrates a bottom perspective view of the example differential pulley actuator 700.

The differential pulley actuator 700 includes a first input drive gear 702 for coupling to a motor 704 and the first input drive gear 702 couples rotation of the motor 704 to rotation of an output pulley 706. The differential pulley actuator 700 includes a first timing belt pulley pair 708a-b coupled to the first input drive gear 702, and rotation of the first input drive gear 702 causes rotation of the first timing belt pulley pair 708a-b. The differential pulley actuator 700 also includes a first idler pulley element 710 suspended between the first timing belt pulley pair 708a-b and the output pulley 706 and held in tension to the first timing belt pulley pair 708a-b via a tension-bearing element 712 and to the output pulley 706 via another tension-bearing element 714.

The differential pulley actuator 700 also includes another input drive gear 716 for coupling to the motor 704, and the input drive gear 716 couples rotation of the motor 704 to rotation of the output pulley 706. The differential pulley actuator 700 includes a second timing belt pulley pair 718a-b coupled to the input drive gear 716, and rotation of the input drive gear 716 causes rotation of the second timing belt pulley pair 718a-b. The differential pulley actuator 700 further includes a second idler pulley element 720 suspended between the second timing belt pulley pair 718a-b and the output pulley 706 and held in tension to the second timing belt pulley pair 718a-b via a tension-bearing element 722 and to the output pulley 706 via the tension-bearing element 714.

The output pulley 706 couples to a load (not shown) and the output pulley 706 couples to the first idler pulley element 710 and the second idler pulley element 720 via the tension-bearing element 706 looping around the output pulley 706. The output pulley 706 is configured to apply motion of the first idler pulley element 710 and the second idler pulley element 720 to the load. A differential or other mechanism may be attached to the output pulley 706 to provide a multiple degree of freedom (DOF) joint.

The first idler pulley element 710 and the second idler pulley element 720 may contain similar components. In FIG. 7A, the second idler pulley element 720 is shown to include a frame 724 that couples to the tension-bearing element 714, and multiple pulleys 726a-b that couple to the frame 724. The tension-bearing element 722 loops around the multiple pulleys 726a-b.

The input drive gears 702 and 716 couple to a gear 728 of the motor 704. The configuration of the differential pulley actuator 700 in FIGS. 7A-7E is such that the first timing belt pulley pair 708a-b and the second timing belt pulley pair 718a-b are positioned in a side by side configuration, or a parallel configuration, and the motor 704 is positioned between the first timing belt pulley pair 708a-b and the second timing belt pulley pair 718a-b.

Within examples, in operation of the differential pulley actuator 700, rotation of the first timing belt pulley pair 708a-b causes the tension-bearing element 712 to wind onto a first pulley 708a of the first timing belt pulley pair 708a-b and unwind from a second pulley 708b of the first timing belt pulley pair 708a-b. Rotation of the second timing belt pulley pair 718a-b causes the tension-bearing element 722 to wind onto a first pulley 718a of the second timing belt pulley pair 718a-b and unwind from a second pulley 718b of the second timing belt pulley pair 718a-b.

In addition, rotation of the first timing belt pulley pair 708a-b and the second timing belt pulley pair 718a-b causes movement of the first idler pulley element 710 and the second idler pulley element 720 toward and away from the output pulley 706 resulting in the tension-bearing element 714 being pulled to rotate the output pulley 706.

The differential pulley actuator 700 is provided in a configuration such that the input drive gears 702 and 716 and the output pulley 706 each rotate about respective axes that are parallel. The first timing belt pulley pair 708a-b and the second timing belt pulley pair 718a-b are upright with respect to the output pulley 706.

Figure 8:
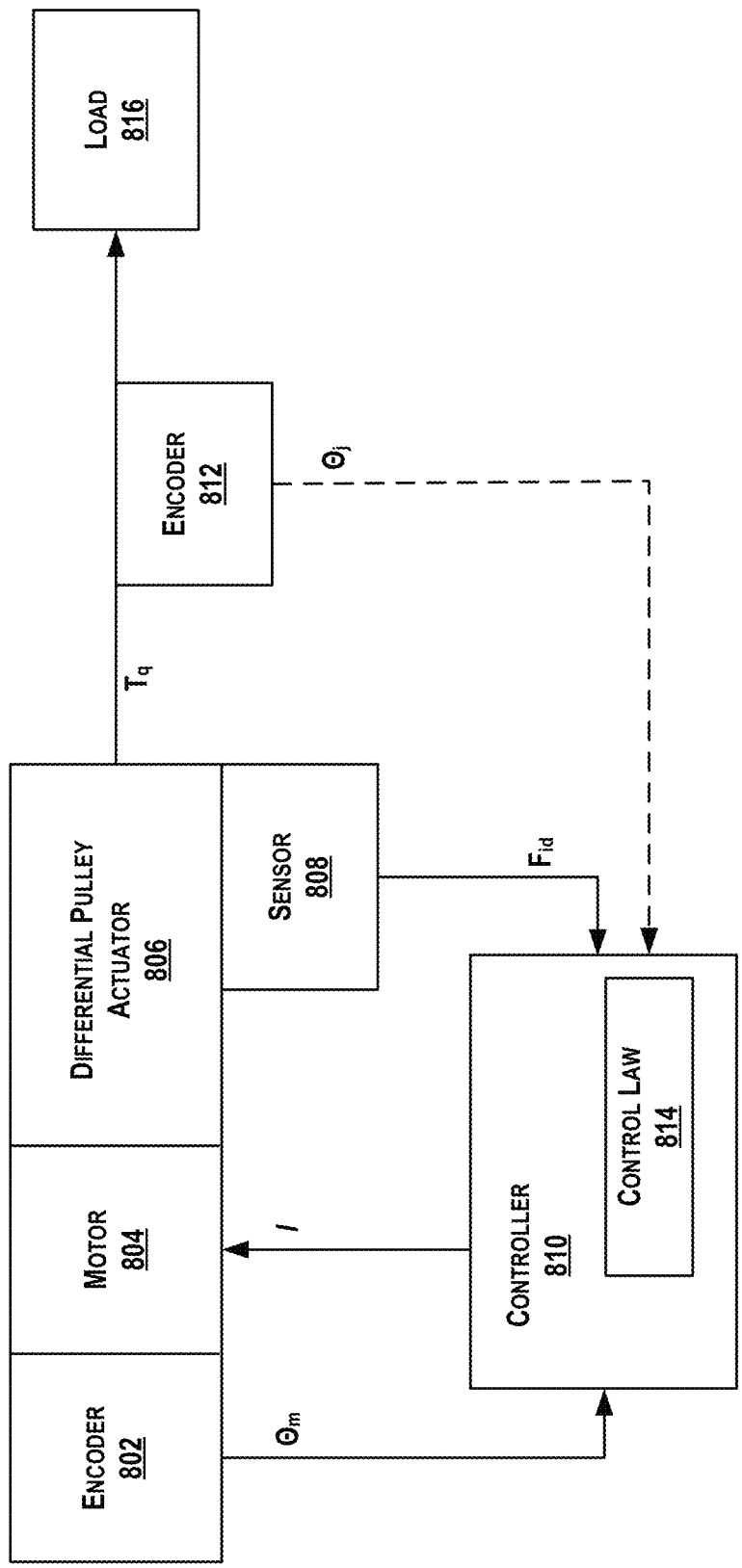
FIG. 8 is a block diagram illustrating an example system for control of a differential pulley actuator.

FIG. 8 is a block diagram illustrating an example system for control of a differential pulley actuator. As shown in FIG. 8, an encoder 802 may couple to a motor 804 that drives a differential pulley actuator 806. A tension or force sensor 808 determines a tension sensor measurement, $F_{id}$, and outputs the tension sensor measurement to a controller 810. Another encoder 812 may couple to an output pulley of the differential pulley actuator 806 to sense a joint angle, $\Theta_j$, or load position. The encoders 802 and 812 may be optical encoders, Hall effect sensors, or other capacitive angle sensors, for example. The differential pulley actuator 806 may be controlled by the motor amplifier 810 that receives as inputs $\Theta_m$, the motor angle, the tension sensor measurement, $F_{id}$, and optionally $\Theta_j$, the joint angle, and outputs a commanded motor winding current, I, as a function of these inputs according to a control law module 814. The motor winding current, I, causes the motor 804 to drive the differential pulley actuator 806 for an output torque, $T_q$, that is applied to a load 816.

The control law module 814 may transform state variables into command current to motor. A full state control or measure of a full state of the system (e.g., motor position with encoder, motor velocity, motor acceleration, joint position with encoder, output torque with load cells) can be utilized as a linear combination to calculate the command current. A servo-loop is created around tensor sensor values for torque applied at a joint. The control law module 814 may operate as a known proportional integral derivative (PID) module, for example. A PID controller may include a control loop feedback mechanism that calculates an error value as a difference between a measured process variable and a desired set point. The PID controller attempts to minimize the error by adjusting process control outputs. The PID controller algorithm may involve three separate constant parameters, including the proportional, the integral, and the derivative values, denoted P, I, and D. These values can be interpreted in terms of time: P depends on the present error, I on accumulation of past errors, and D is a prediction of future errors, based on current rate of change. A weighted sum of these three actions is used to adjust a process via a control element such as the output torque to be applied.

The control law module 814, or other components of the design in FIG. 8, may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The control law module 814, or other components of the design in FIG. 8, may also be a computing device (or components of a computing device such as one or more processors), that may execute instructions to perform functions as described herein.

Figure 9:
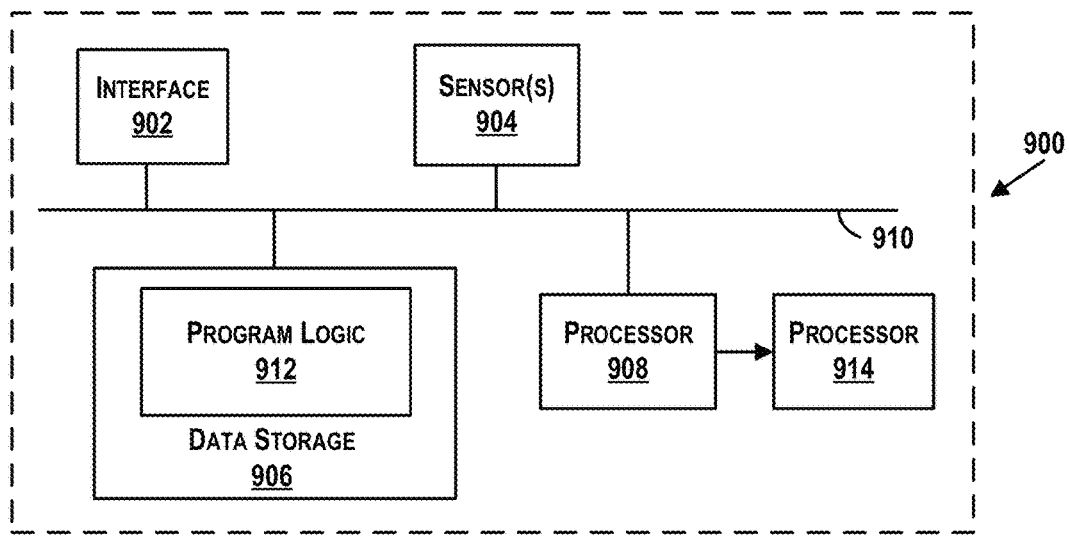
FIG. 9 illustrates a schematic drawing of an example computing device.

FIG. 9 illustrates a schematic drawing of an example computing device 900. In some examples, some components illustrated in FIG. 9 may be distributed across multiple computing devices. However, for the sake of example, the components are shown and described as part of one example device 900. The device 900 may be or include a mobile device, desktop computer, tablet computer, or similar device that may be configured to perform the functions described herein.

The device 900 may include an interface 902, sensor(s) 904, data storage 906, and a processor 908. Components illustrated in FIG. 9 may be linked together by a communication link 910. The communication link 910 is illustrated as a wired connection; however, wireless connections may also be used. The device 900 may also include hardware to enable communication within the device 900 and between the client device 900 and another computing device (not shown), such as a server entity. The hardware may include transmitters, receivers, and antennas, for example.

The interface 902 may be configured to allow the device 900 to communicate with another computing device (not shown), such as a server. Thus, the interface 902 may be configured to receive input data from one or more computing devices, and may also be configured to send output data to the one or more computing devices. The interface 902 may also be configured to receive input from and provide output to a torque controlled actuator or modular link of a robot arm, for example. The interface 902 may include a receiver and transmitter to receive and send data. In other examples, the interface 902 may also include a user-interface, such as a keyboard, microphone, touchscreen, etc., to receive inputs as well.

The sensor 904 may include one or more sensors, or may represent one or more sensors included within the device 900. Example sensors include an accelerometer, gyroscope, pedometer, light sensors, microphone, camera, or other location and/or context-aware sensors that may collect data of the differential pulley actuator (e.g., motion of timing belt pulleys or idlers) and provide the data to the data storage 906 or processor 908.

The processor 908 may be configured to receive data from the interface 902, sensor 904, and data storage 906. The data storage 906 may store program logic 912 that can be accessed and executed by the processor 908 to perform functions executable to determine instructions for operation of the differential pulley actuator. Example functions include determination of motor current based on sensed tension in timing belts, output torque, and optionally angular displacements of output pulleys based on a control loop or other feedback mechanism to determine desired output torques. Any functions described herein, or other example functions for the differential pulley actuator may be performed by the device 900 or one or more processors 908 of the device via execution of instructions stored on the data storage 906 or otherwise received.

The device 900 is illustrated to include an additional processor 914. The processor 914 may be configured to control other aspects of the device 900 including displays or outputs of the device 900 (e.g., the processor 914 may be a GPU). Example methods described herein may be performed individually by components of the device 900, or in combination by one or all of the components of the device 900. In one instance, portions of the device 900 may process data and provide an output internally in the device 900 to the processor 914, for example. In other instances, portions of the device 900 may process data and provide outputs externally to other computing devices.

Within some examples herein, operations may be described as methods for performing functions, and methods may be embodied on a computer program product (e.g., a tangible computer readable storage medium or non-transitory computer readable medium) that includes instructions executable to perform the functions.

Figure 10:
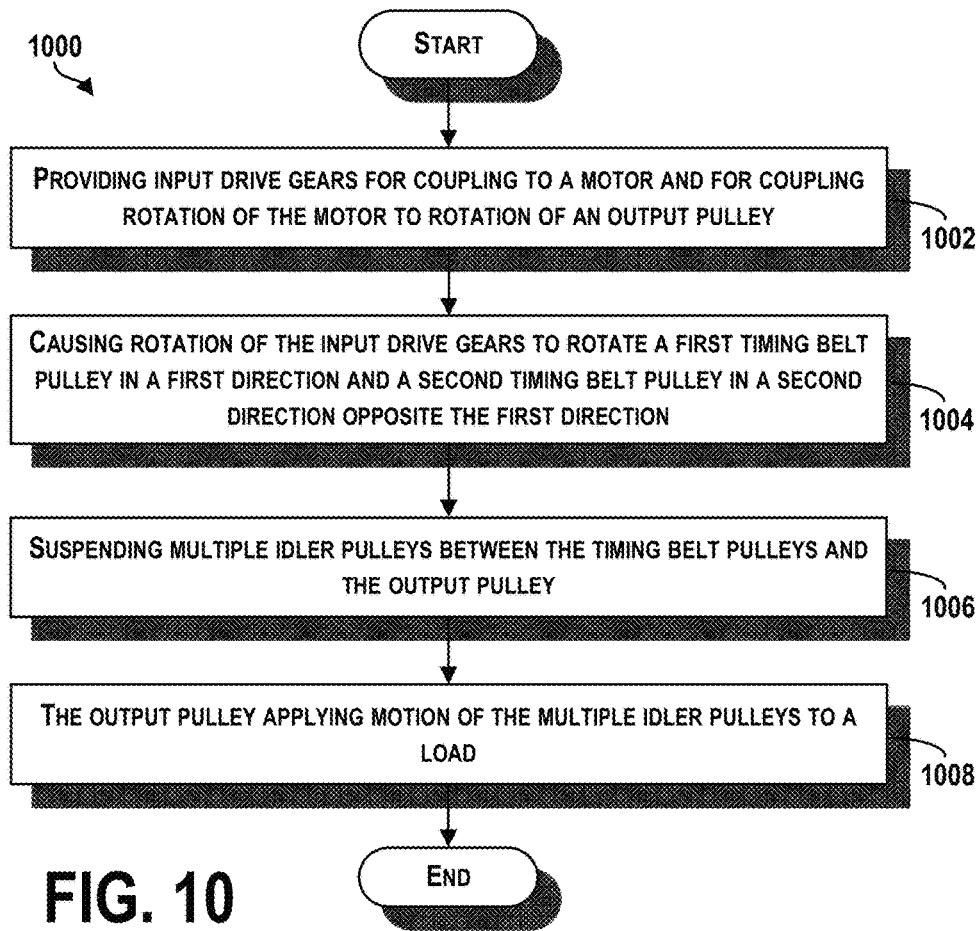
FIG. 10 is a flowchart illustrating an example method for operating a differential pulley actuator.

FIG. 10 is a flowchart illustrating an example method 1000 for operating a differential pulley actuator. At block 1002, the method 1000 includes providing input drive gears for coupling to a motor and for coupling rotation of the motor to rotation of an output pulley. At block 1004, the method 1000 includes causing rotation of the input drive gears to rotate a first timing belt pulley in a first direction and a second timing belt pulley in a second direction opposite the first direction. At block 1006, the method 1000 includes suspending multiple idler pulleys between the timing belt pulleys and the output pulley. The multiple idler pulleys are held in tension between the one or more timing belt pulleys via a first tension-bearing element and the output pulley via a second tension-bearing element, and the first tension-bearing element loops around the one or more timing belt pulleys and the multiple idler pulleys. At block 1008, the method 1000 includes the output pulley applying motion of the multiple idler pulleys to a load.

The differential pulley actuator described in FIGS. 1-10 above may be used in many implementations. Example implementations include a modular robot link or actuator system.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A differential pulley actuator comprising:
   an input drive gear for coupling to a motor, wherein the input drive gear couples rotation of the motor to rotation of an output pulley;
   a first timing belt pulley pair and a second timing belt pulley pair coupled to the input drive gear, wherein rotation of the input drive gear causes rotation of the first timing belt pulley pair and the second timing belt pulley pair;
   a first idler pulley element suspended between the first timing belt pulley pair and the output pulley and held in tension to the first timing belt pulley pair via a first tension-bearing element and to the output pulley via a second tension-bearing element;
   a second idler pulley element suspended between the second timing belt pulley pair and the output pulley and held in tension to the second timing belt pulley pair via a third tension-bearing element and to the output pulley via the second tension-bearing element; and
   the output pulley for coupling to a load, wherein the output pulley couples to the first idler pulley element and the second idler pulley element via the second tension-bearing element looping around the output pulley and is configured to apply motion of the first idler pulley element and the second idler pulley element to the load.

2. The differential pulley actuator of claim 1, wherein:
   rotation of the first timing belt pulley pair causes the first tension-bearing element to wind onto a first pulley of the first timing belt pulley pair and unwind from a second pulley of the first timing belt pulley pair; and
   rotation of the second timing belt pulley pair causes the third tension-bearing element to wind onto a first pulley of the second timing belt pulley pair and unwind from a second pulley of the second timing belt pulley pair.

3. The differential pulley actuator of claim 1, wherein:
   rotation of the first timing belt pulley pair and the second timing belt pulley pair causes movement of the first idler pulley element and the second idler pulley element toward and away from the output pulley resulting in the second tension-bearing element being pulled to rotate the output pulley.

4. The differential pulley actuator of claim 1, wherein the first timing belt pulley pair couples to the input drive gear and the second timing belt pulley pair couples to the first timing belt pulley pair such that the first timing belt pulley pair and the second timing belt pulley pair are coupled in serial in a stacked configuration.

5. The differential pulley actuator of claim 1, wherein the input drive gear and the output pulley are provided in a configuration to each rotate about respective axes, wherein the respective axes are perpendicular.

6. The differential pulley actuator of claim 1, wherein the first idler pulley element comprises:
   a frame coupled to the second tension-bearing element; and
   multiple pulleys coupled to the frame, wherein the first tension-bearing element loops around the multiple pulleys.

7. The differential pulley actuator of claim 1, wherein the first timing belt pulley pair and the second timing belt pulley pair provide a differential gear-ratio between the motor and the first timing belt pulley pair and the second timing belt pulley pair.

8. The differential pulley actuator of claim 1, wherein the first tension-bearing element and the second tension-bearing element comprise one of a belt, a chain, or a cable.

9. The differential pulley actuator of claim 1, wherein the first timing belt pulley pair and the second timing belt pulley pair include teeth, and wherein the first tension-bearing element comprises a toothed belt that interlocks to the teeth of the first timing belt pulley pair and the second timing belt pulley pair.

10. The differential pulley actuator of claim 1, further comprising:
    a motor; and
    a motor encoder coupled to the motor to determine a position of the motor and enable a control loop to control position of the output pulley.

11. The differential pulley actuator of claim 1, further comprising a motor;
    a force sensor coupled to the output pulley; and
    a processor to control an input to the motor based on an output from the force sensor.

12. A differential pulley actuator comprising:
    a first input drive gear for coupling to a motor, wherein the first input drive gear couples rotation of the motor to rotation of an output pulley;
    a first timing belt pulley pair coupled to the first input drive gear, wherein rotation of the first input drive gear causes rotation of the first timing belt pulley pair;
    a first idler pulley element suspended between the first timing belt pulley pair and the output pulley and held in tension to the first timing belt pulley pair via a first tension-bearing element and to the output pulley via a second tension-bearing element;
    a second input drive gear for coupling to the motor, wherein the second input drive gear couples rotation of the motor to rotation of the output pulley;
    a second timing belt pulley pair coupled to the second input drive gear, wherein rotation of the second input drive gear causes rotation of the second timing belt pulley pair;
    a second idler pulley element suspended between the second timing belt pulley pair and the output pulley and held in tension to the second timing belt pulley pair via a third tension-bearing element and to the output pulley via the second tension-bearing element; and
    the output pulley for coupling to a load, wherein the output pulley couples to the first idler pulley element and the second idler pulley element via the second tension-bearing element looping around the output pulley and is configured to apply motion of the first idler pulley element and the second idler pulley element to the load.

13. The differential pulley actuator of claim 12, further comprising:
    a motor; and
    wherein the first timing belt pulley pair and the second timing belt pulley pair are positioned in a side by side configuration, and the motor is positioned between the first timing belt pulley pair and the second timing belt pulley pair.

14. The differential pulley actuator of claim 12, wherein:
    rotation of the first timing belt pulley pair causes the first tension-bearing element to wind onto a first pulley of the first timing belt pulley pair and unwind from a second pulley of the first timing belt pulley pair; and
    rotation of the second timing belt pulley pair causes the third tension-bearing element to wind onto a first pulley of the second timing belt pulley pair and unwind from a second pulley of the second timing belt pulley pair.

15. The differential pulley actuator of claim 12, wherein:
    rotation of the first timing belt pulley pair and the second timing belt pulley pair causes movement of the first idler pulley element and the second idler pulley element toward and away from the output pulley resulting in the second tension-bearing element being pulled to rotate the output pulley.

16. The differential pulley actuator of claim 12, wherein the first input drive gear, the second input drive gear, and the output pulley are provided in a configuration to each rotate about respective axes, wherein the respective axes are parallel.

17. The differential pulley actuator of claim 12, wherein the first tension-bearing element and the second tension-bearing element comprise one of a belt, a chain, or a cable.

18. The differential pulley actuator of claim 12, further comprising:
    a motor; and
    a motor encoder coupled to the motor to determine a position of the motor and enable a control loop to control position of the output pulley.

19. The differential pulley actuator of claim 12, further comprising
    a motor;
    a force sensor coupled to the output pulley; and
    a processor to control an input to the motor based on an output from the force sensor.

20. The differential pulley actuator of claim 12, wherein the first timing belt pulley pair and the second timing belt pulley pair provide a differential gear-ratio between the motor and the first timing belt pulley pair and the second timing belt pulley pair.

* * * * *